(12) United States Patent
Xu et al.

(10) Patent No.: US 10,104,541 B2
(45) Date of Patent: *Oct. 16, 2018

(54) METHOD AND APPARATUS FOR ESTABLISHING USER PLANE BEARER

(71) Applicant: Samsung Electronics Co., Ltd., Suwon-si, Gyeonggi-do (KR)

(72) Inventors: Lixiang Xu, Beijing (CN); Hong Wang, Beijing (CN)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/675,124

(22) Filed: Aug. 11, 2017

(65) Prior Publication Data
US 2017/0339556 A1 Nov. 23, 2017

Related U.S. Application Data

(63) Continuation of application No. 14/742,108, filed on Jun. 17, 2015, now Pat. No. 9,736,683.

(30) Foreign Application Priority Data
Jun. 19, 2014 (CN) .......................... 2014 1 0276702

(51) Int. Cl.
*H04W 8/26* (2009.01)
*H04W 76/10* (2018.01)
(Continued)

(52) U.S. Cl.
CPC ............. *H04W 8/26* (2013.01); *H04L 69/167* (2013.01); *H04W 76/10* (2018.02); *H04W 76/12* (2018.02);
(Continued)

(58) Field of Classification Search
None
See application file for complete search history.

(56) References Cited

U.S. PATENT DOCUMENTS 9,277,579 B1    3/2016 Zhao et al.
9,723,531 B2 *  8/2017 Vesterinen ............. H04L 47/34
(Continued)

OTHER PUBLICATIONS

'3GPP; TSGRAN; Evolved Universal Terrestrial Radio Access (E-UTRA);Relay architectures for E-UTRA(LTE-advanced)(Release 9)', 3GPP TR 36.806 V0.3.1, Dec. 2, 2011.
(Continued)

*Primary Examiner* — Kibrom T Hailu
(74) *Attorney, Agent, or Firm* — Jefferson IP Law, LLP

(57) ABSTRACT

A method and an apparatus for establishing a user plane bearer are provided. The method includes receiving a transport layer address supported by a serving gateway (SGW)/packet gateway (PGW) from a mobile management entity (MME), selecting, by a radio access network (RAN) entity, directly the appropriate transport layer address to establish the user plane bearer, or after receiving the transport layer address transmitted by the SGW/PGW, selecting, by the MME, the appropriate transport layer address to establish the user plane bearer, or reporting, by the MME, the obtained transport layer address used by the access entity to the SGW/PGW to establish the user plane bearer.

16 Claims, 17 Drawing Sheets

(51) Int. Cl.
*H04W 80/04* (2009.01)
*H04L 29/06* (2006.01)
*H04W 76/12* (2018.01)
*H04L 29/12* (2006.01)
*H04W 84/04* (2009.01)
*H04W 76/11* (2018.01)

(52) U.S. Cl.
CPC ....... *H04W 80/045* (2013.01); *H04L 61/2007* (2013.01); *H04W 76/11* (2018.02); *H04W 84/045* (2013.01)

(56) References Cited

U.S. PATENT DOCUMENTS

| | | | |
|---|---|---|---|
| 9,736,683 B2* | 8/2017 | Xu | H04W 8/26 |
| 2010/0278108 A1 | 11/2010 | Cho et al. | |
| 2011/0103310 A1 | 5/2011 | Stojanovski et al. | |
| 2011/0128913 A1 | 6/2011 | Chowdhury et al. | |
| 2011/0235605 A1 | 9/2011 | Yeoum et al. | |
| 2011/0292896 A1 | 12/2011 | Yeuom et al. | |
| 2012/0042058 A1 | 2/2012 | Shaikh et al. | |
| 2012/0214445 A1 | 8/2012 | Stojanovski et al. | |
| 2014/0198637 A1 | 7/2014 | Shan et al. | |
| 2015/0139086 A1* | 5/2015 | Murakami | H04W 8/26 370/329 |

OTHER PUBLICATIONS

"(H)eNB Registration procedure", R3-140138, 3GPP TSG RAN WG3 #83,Prague, Czech Republic, Jan. 31, 2014.

SA2: "LS on MME control for consistence of S1-U and S1-MME address type", 3GPP Draft; C4-141247. 3rd Generation Partnership Project (3GPP), Mobile Competence Centre ; 650. Route Des Lucioles; F-06921 Sophia-Antipolis Cedex; France, vol. CT WG4. No. Cape Town; Jul. 14, 2014-Jul. 18, 2014, Jun. 17, 2014, XP050810765.

NEC: "The presence order of IPv4 and IPv6 addresses", Generation Partnership Project (3GPP), Mobile Competence Centre ; 650. Route Des Lucioles ; F-06921 Sophia-Antipolis Cedex; France, vol. RAN WG3. No. San Francisco. USA; Nov. 11, 2013-Nov. 15, 2013, Nov. 12, 2013, XP050738224.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP Draft; 36300-C10. 3rd Generation Partnership Project (3GPP), Mobile Competence Centre ; 650. Route Des Lucioles ; F-06921 Sophia-Antipolis Cedex; France, Mar. 19, 2014, XP050816510.

* cited by examiner

METHOD AND APPARATUS FOR ESTABLISHING USER PLANE BEARER

CROSS-REFERENCE TO RELATED APPLICATION(S)

This application is a continuation application of prior application Ser. No. 14/742,108, filed on Jun. 17, 2015, which has issued as U.S. Pat. No. 9,736,683 on Aug. 15, 2017 and claimed the benefit under 35 U.S.C. § 119(a) of a Chinese patent application filed on Jun. 19, 2014 in the Sino Intellectual Property Office and assigned Serial number 201410276702.2, the entire disclosure of each of which is hereby incorporated by reference.

TECHNICAL FIELD

The present disclosure relates to radio communication technologies. More particularly the present disclosure relates to a method and an apparatus for establishing a user plane bearer.

BACKGROUND

Currently, mobile communication technologies tend to provide highrate multimedia services increasingly.

FIG. 1 is a schematic diagram illustrating a System Architecture Evolution (SAE) system according to the related art.

Referring to FIG. 1, in the SAE system, a User Equipment (UE) 101 is a terminal device for receiving data. An Evolved Universal Terrestrial Radio Access Network (E-UTRAN) 102 is a radio access network which includes an eNodeB/NodeB for providing a radio network interface for the UE. A Mobile Management Entity (MME) 103 is adapted to manage mobility contexts, session contexts and security information of the UE. A Serving Gateway (SGW) 104 is adapted to provide functions of a user plane. The MME 103 and the SGW 104 may be in the same physical entity. A Packet Gateway (PGW) 105 is adapted to implement charging and legal monitoring functions. The PGW 105 and the SGW 104 may be in the same physical entity. A Policy and Charging Rules Function (PCRF) 106 is adapted to provide Quality of Service (QoS) policies and charging rules. A Service GPRS Supporting Node (SGSN) 108 is a network node device for providing routing for data transmission in a Universal Mobile Telecommunications System (UMTS). A Home Subscriber Server (HSS) 109 is a home sub-system of the UE and is adapted to protect user information including the current location of the UE, the address of a serving node, user security information and packet data contexts of the UE.

FIG. 2 is a flowchart illustrating a UE Attach process according to the related art.

Referring to FIG. 2, at operation 201, a UE transmits an Attach Request to an MME. The Attach Request is transmitted to the MME through an evolved Node B (eNB) by using a Radio Resource Control (RRC) message and an S1 message.

At operation 202, the MME transmits a Create Session Request to a SGW/PGW. If the SGW and the PGW are separated, the signaling process between the SGW and the PGW is omitted herein.

At operation 203, the SGW/PGW transmits a Create Session Response to the MME. The Create Session Response includes a transport layer address and an uplink Tunnel Endpoint Identifier (TEID) of an S1 interface assigned by the SGW for each bearer of the UE. The transport layer address may be an Internet Protocol version 4 (IPv4) and/or an Internet Protocol version 6 (IPv6).

At operation 204, the MME transmits an Initial Context Setup Request to the eNB. The Initial Context Setup Request includes the transport layer address and the uplink TEID of the S1 interface assigned by the SGW for each bearer of the UE. The transport layer address may be the IPv4 and/or the IPv6.

At operation 205, the eNB transmits an RRC connection reconfiguration message to the UE.

At operation 206, the UE transmits an RRC connection reconfiguration response to the eNB.

At operation 207, the eNB transmits an Initial Context Setup Response to the MME. The Initial Context Setup Response includes a transport layer address and a downlink TEID of the S1 interface assigned by the eNB for each bearer of the UE. The transport layer address may be the IPv4 and/or the IPv6.

At operation 208, the UE transmits a Direct Transfer message to the eNB.

At operation 209, the eNB transmits a Non access stratum (NAS) message Attach complete message to the MME.

In this operation, the eNB transmits the Attach complete to the MME by using an S1 uplink direct transfer message.

At operation 210, the MME transmits a Bearer Modification Request to the SGW/PGW. The Bearer Modification Request includes the transport layer address and the downlink TEID of the S1 interface assigned by the eNB for each bearer of the UE, which are received from the eNB. The transport layer address may be the IPv4 and/or the IPv6.

At operation 211, the SGW/PGW transmits a Bearer Modification Response to the MME.

In technologies of the related art, the transport layer address transmitted from the SGW/PGW to the MME may be an IPv4 address or an IPv6 address or both the IPv4 address and the IPv6 address, and the S1 interface only has one IP address. When the IP address versions supported by the SGW and the eNB are different, issues to be addressed include how to establish a user plane bearer correctly and which node selects the IP version of the S1 interface.

Therefore, a need exists for a method and an apparatus for establishing a user plane bearer.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for establishing a user plane bearer, so that a user plane bearer may be established correctly when a system architecture evolution (SAE) system includes both a device supporting the internet protocol version 4 (IPv4) and a device supporting the internet protocol version 6 (IPv6).

Another aspect of the present disclosure is to provide an apparatus for establishing a user plane bearer, so that a user plane bearer may be established correctly when an SAE system includes both a device supporting the IPv4 and a device supporting the IPv6.

In accordance with an aspect of the present disclosure, a method for establishing a user plane bearer is provided. The method includes receiving, by a home evolved Node B gateway (HeNB GW), a first message including at least one transport layer addresses of at least one IP version assigned by a serving gateway (SGW), selecting, by the HeNB GW, an IP version to be used for S1-U interface, if the first message includes two transport layer address of different version, and transmitting, by the HeNB GW, a second message including a transport layer address of the selected IP version to a home evolved Node B (HeNB).

In accordance with another aspect of the present disclosure, a method for establishing a user plane bearer is provided. The method includes receiving, by a mobility management entity (MME), a first message including at least one transport layer addresses of at least one IP version assigned by a serving gateway (SGW), transmitting, by the MME, a second message including the at least one transport layer addresses of the at least one IP version to a home evolved Node B gateway (HeNB GW), wherein an IP version to be used for S1-U interface is selected by the HeNB GW, if the second message includes two transport layer address of different version.

In accordance with another aspect of the present disclosure, an apparatus for establishing a user plane bearer is provided. The apparatus includes a transceiver configured to transmit and receive a signal, and a controller configured to receive a first message including at least one transport layer addresses of at least one IP version assigned by a serving gateway (SGW), select an IP version to be used for S1-U interface, if the first message includes two transport layer address of different version, and transmit a second message including a transport layer address of the selected IP version to a home evolved Node B (HeNB).

In accordance with another aspect of the present disclosure, an apparatus for establishing a user plane bearer is provided. The apparatus includes a transceiver configured to transmit and receive a signal, and a controller configured to receive a first message including at least one transport layer addresses of at least one IP version assigned by a serving gateway (SGW), transmit a second message including the at least one transport layer addresses of the at least one IP version to a home evolved Node B gateway (HeNB GW), wherein an IP version to be used for S1-U interface is selected by the HeNB GW, if the second message includes two transport layer address of different version.

According to the above technical solutions, by using the method and apparatus provided by the present disclosure, when receiving the transport layer address supported by the SGW/PGW from the MME, the RAN entity directly selects the appropriate transport layer address to establish the user plane bearer, or after receiving the transport layer address transmitted by the SGW/PGW, the MME selects the appropriate transport layer address to establish the user plane bearer, or the MME reports the obtained transport layer address used by the access entity to the SGW/PGW, so as to establish the user plane bearer. In this way, a user plane bearer may be established correctly when the SAE system includes both a device supporting the IPv4 and a device supporting the IPv6.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
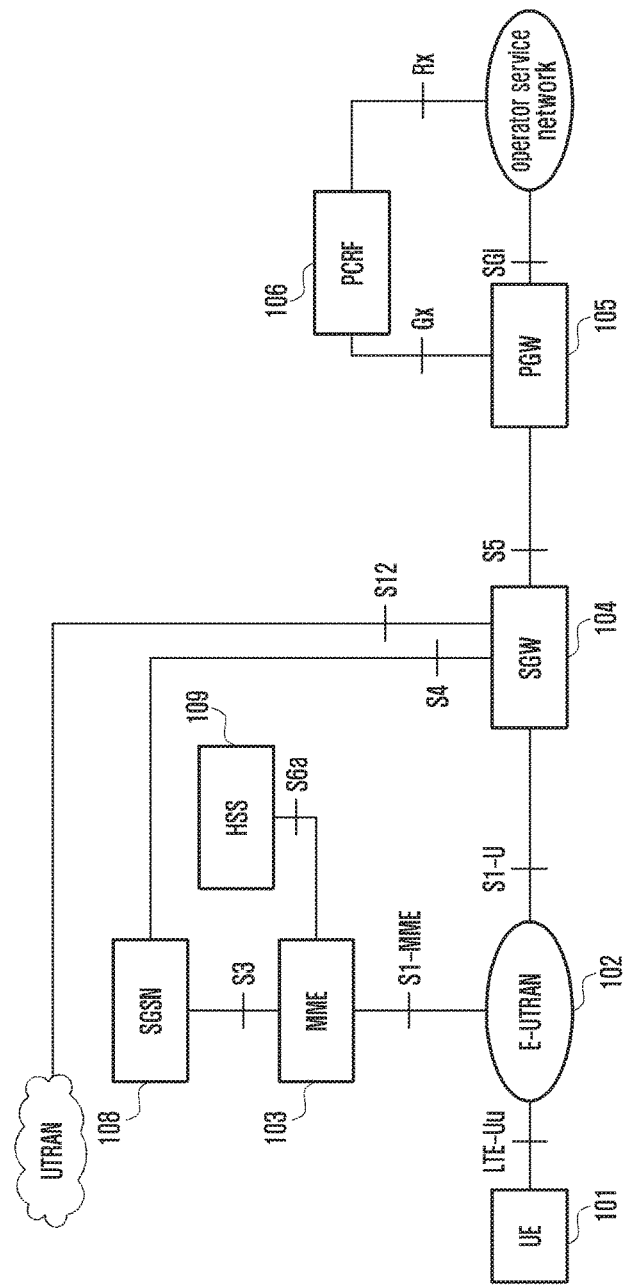
FIG. 1 is a schematic diagram illustrating a system architecture evolution (SAE) system according to the related art.

FIG. 1 is a schematic diagram illustrating a system architecture evolution (SAE) system according to the related art.

Figure 2:
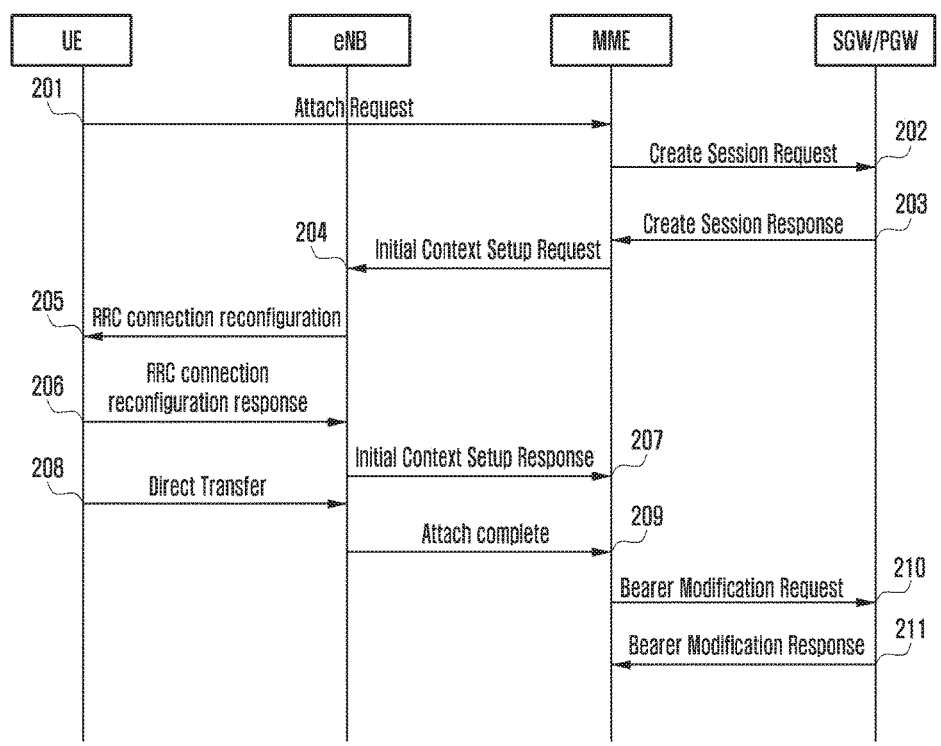
FIG. 2 is a flowchart illustrating a user equipment (UE) Attach process according to the related art.

FIG. 2 is a flowchart illustrating a user equipment (UE) Attach process according to the related art.

When an SAE system includes both a device supporting an internet protocol version 4 (IPv4) and a device supporting an internet protocol version 6 (IPv6), for the purpose of establishing a user plane bearer correctly and successfully and ensuring the interoperability between different manufacturers, in the method and apparatus provided by the present disclosure, when receiving the transport layer address supported by the serving gateway (SGW)/packet gateway (PGW) from the mobile management entity (MME), the radio access network (RAN) entity directly selects the appropriate transport layer address to establish the user plane bearer, or after receiving the transport layer address transmitted by the SGW/PGW, the MME selects the appropriate transport layer address to establish the user plane bearer, or the MME reports the obtained transport layer address used by an access entity to the SGW/PGW, so as to establish the user plane bearer.

In various embodiments of the present disclosure, the access entity may be an evolved Node B (eNB), a home eNB gateway, a home eNB, a master eNB, a secondary eNB, and the like. Embodiments of the present disclosure will be provided as follows.

Figure 3:
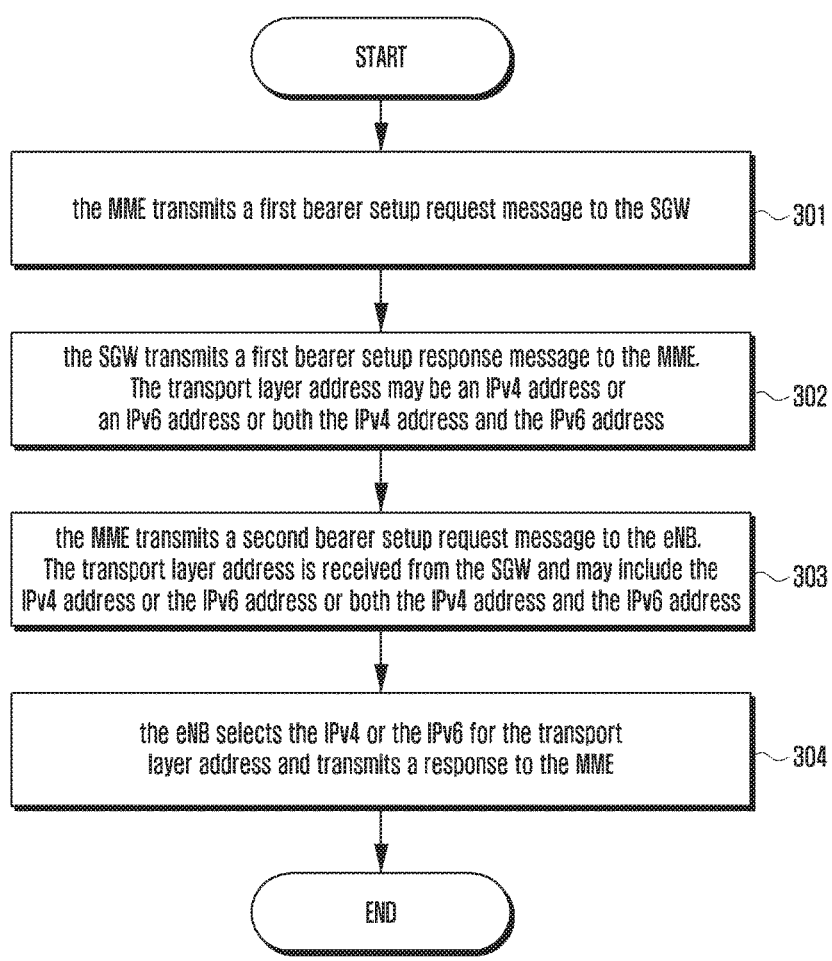
FIG. 3 is a flowchart illustrating a first method for establishing a user plane bearer according to an embodiment of the present disclosure.

FIG. 3 is a flowchart illustrating a first method for establishing a user plane bearer according to an embodiment of the present disclosure.

Referring to FIG. 3, an MME directly transmits to an eNB a transport layer address and an uplink TEID assigned by a SGW for each bearer which are received from the SGW. When receiving the transport layer address of both an IPv4 and an IPv6, the eNB selects one of the IPv4 or the IPv6. The method includes the following processing.

At operation 301, the MME transmits a first bearer setup request message to the SGW.

The first bearer setup request message may be a Create Session Request, or a Create Bearer Request, or another message for bearer setup request over a S11 interface.

At operation 302, the SGW transmits a first bearer setup response message to the MME.

The response includes the transport layer address and the uplink tunnel endpoint identifier (TEID) assigned by the SGW for each bearer. The transport layer address may be an IPv4 address or an IPv6 address or both the IPv4 address and the IPv6 address. When both the IPv4 address and IPv6 address are included, the IPv4 address may be located before or after the IPv6 address. When the SGW supports only the IPv4, only the IPv4 address is included. When the SGW supports only the IPv6, only the IPv6 address is included. When the SGW supports both the IPv4 and the IPv6, both the IPv4 address and the IPv6 address are included. The first bearer setup response may be a Create Session Response or a Create Bearer Response, or another for bearer setup response message used over the S11 interface.

At operation 303, the MME transmits a second bearer setup request message to the eNB. The message includes the transport layer address and the uplink TEID assigned by the SGW for each bearer which are received from the SGW.

The transport layer address is received from the SGW and may include the IPv4 address or the IPv6 address or both the IPv4 address and the IPv6 address. The second bearer setup request message may be an Initial Context Setup Request or an E-RAB Setup Request, or a Handover Request, or another message for bearer setup request used over an S1 interface.

At operation 304, the eNB transmits a response to the MME. The response includes a transport layer address and a downlink TEID assigned by the eNB for each bearer.

If the transport layer address included in the request message received by the eNB from the MME is the IPv4, and the eNB supports the IPv4, the eNB assigns the transport layer address of the IPv4, and transmits the assigned transport layer address to the MME through the response.

If the eNB does not support the IPv4, the eNB transmits a failure response to the MME. The failure response includes a failure reason, e.g., the transport layer address is not supported.

If the transport layer address included in the request message received by the eNB from the MME is the IPv6, and the eNB supports the IPv6, the eNB assigns the transport layer address of the IPv6, and transmits the transport layer address to the MME through the response. If the eNB does not support the IPv6, the eNB transmits a failure response to the MME. The failure response includes a failure reason, e.g., the transport layer address is not supported.

If the transport layer address included in the request message received by the eNB from the MME includes both the IPv4 address and the IPv6 address, the eNB selects the IPv4 or the IPv6 according to an IP version supported by the eNB, and assigns the transport layer address corresponding to the selected IP version. The transport layer address assigned for each bearer is included in the response. If the eNB supports the IPv4, the IPv4 is selected. If the eNB supports the IPv6, the IPv6 is selected. If the eNB supports both the IPv4 and the IPv6, the eNB selects the IPv4 or the IPv6 according to implementation or O&M configurations.

Although the eNB receives the IPv4 address and the IPv6 address from the MME, after the eNB selects the transport layer address version, the eNB transmits uplink data to the SGW according to the uplink TEID assigned by the SGW and the transport layer address assigned by the SGW corresponding to the IP version selected by the eNB.

The MME transmits the transport layer address and the downlink TEID assigned by the eNB for each bearer to the SGW.

If the SGW transmits both the IPv4 address and the IPv6 address to the MME, after receiving the downlink TEID and the transport layer address, the SGW knows the IP version supported or selected by the eNB. The SGW transmits downlink data according to the downlink TEID and the transport layer address, and receives uplink data according to the TEID assigned by the SGW and the transport layer address of the corresponding version.

By using the above method, when the network includes both the device supporting the IPv4 and the device supporting the IPv6, the user plane bearer may be established correctly and successfully, thereby ensuring interoperability between different manufacturers, and avoiding modifying the MME.

Figure 4:
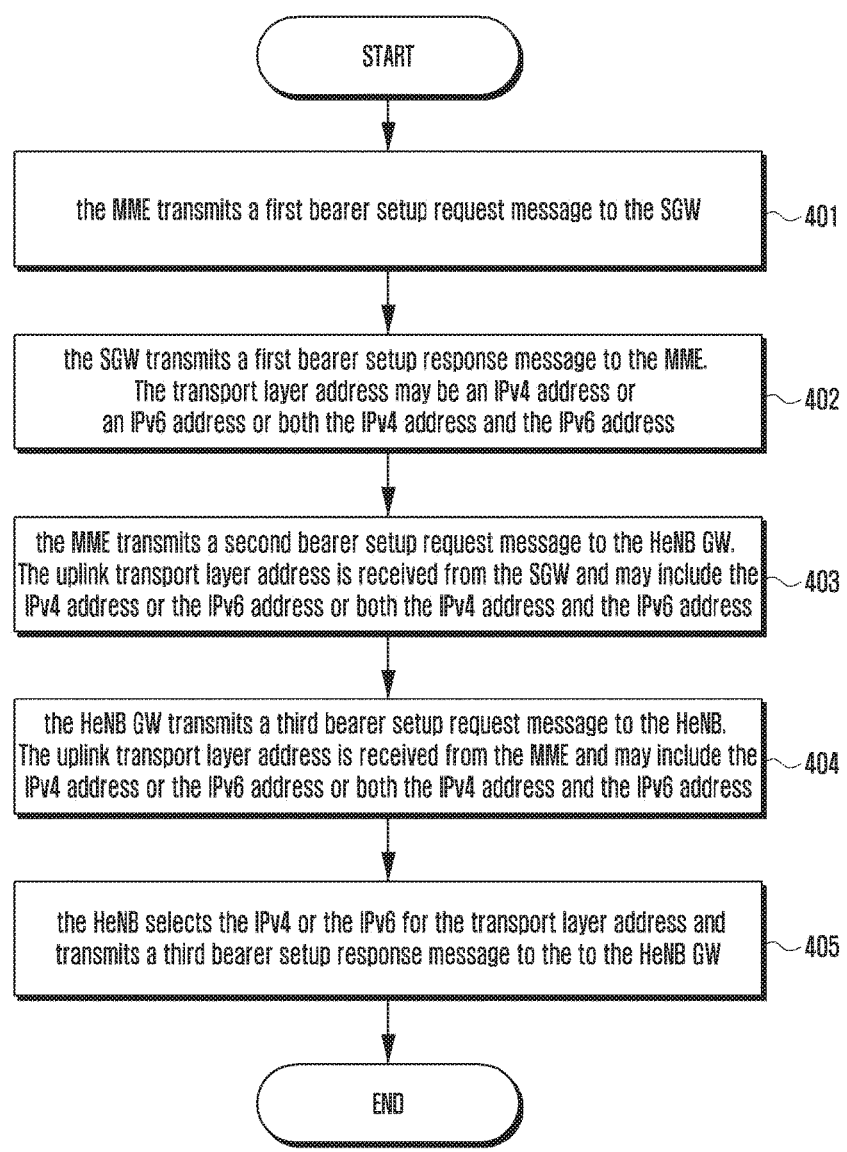
FIG. 4 is a flowchart illustrating a second method for establishing a user plane bearer according to an embodiment of the present disclosure.

FIG. 4 is a flowchart illustrating a second method for establishing a user plane bearer according to an embodiment of the present disclosure.

Referring to FIG. 4, an MME directly transmits a home eNB (HeNB) gateway (GW) a transport layer address and an uplink TEID assigned by a SGW for each bearer which are received from the SGW. The HeNB GW directly transmits to an HeNB the transport layer address and the uplink TEID assigned by the SGW for each bearer which are received from the MME. The HeNB selects one of the IPv4 and the IPv6. The method includes the following processing.

The processing at operations 401 and 402 are the same as the processing at operations 301 and 302 respectively, which are not described herein.

At operation 403, the MME transmits a second bearer setup request message to the HeNB GW. The message includes the transport layer address and the uplink TEID assigned by the SGW for each bearer which are received from the SGW. The transport layer address is received from the SGW and may include the IPv4 address or the IPv6 address or both the IPv4 address and the IPv6 address. The second bearer setup request message may be an Initial Context Setup Request or an E-RAB Setup Request, or a Handover Request, or another message for bearer setup request used over an S1 interface.

In the case that user plane data need to be transmitted to the HeNB from the SGW through the HeNB GW, if the request message received by the HeNB GW includes the IPv4 (or IPv6) and the HeNB GW does not support the IPv4 (or IPv6), the HeNB GW transmits a failure response to the MME. The failure response includes a failure reason, e.g., the transport layer address is not supported. If the request message received by the HeNB GW includes the IPv4 (or IPv6) and the HeNB GW or the HeNB of the UE does not support the IPv4 (or IPv6), the HeNB GW transmits a failure response to the MME. The failure response includes a failure reason, e.g., the transport layer address is not supported.

At operation 404, the HeNB GW transmits a third bearer setup request message to the HeNB.

In the case that data is directly transmitted to the HeNB from the SGW and the user plane data are not transmitted through the HeNB GW, the third bearer setup request message includes the transport layer address and the uplink TEID of each bearer which are received from the MME. The transport layer address is received from the MME and may include the IPv4 address or the IPv6 address or both the IPv4 address and the IPv6 address.

The third bearer setup request message may be an Initial Context Setup Request or an E-RAB Setup Request, or a Handover Request, or another message for bearer setup request used over the S1 interface.

At operation 405, the HeNB transmits a response to the HeNB GW. The response includes a transport layer address and a downlink TEID assigned by the HeNB for each bearer.

If the transport layer address included in the request message received by the HeNB from the HeNB GW is the IPv4, and the HeNB supports the IPv4, the HeNB assigns the transport layer address of the IPv4, and transmits the assigned transport layer address to the HeNB GW through the response. If the HeNB does not support the IPv4, the HeNB transmits a failure response to the HeNB GW. The failure response includes a failure reason, e.g., the transport layer address is not supported.

If the transport layer address included in the request message received by the HeNB from the HeNB GW is the IPv6, and the HeNB supports the IPv6, the HeNB assigns the transport layer address of the IPv6, and transmits the assigned transport layer address to the HeNB GW through the response. If the HeNB does not support the IPv6, the HeNB transmits a failure response to the HeNB GW. The failure response includes a failure reason, e.g., the transport layer address is not supported.

If the transport layer address included in the request message received by the HeNB from the HeNB GW includes both the IPv4 address and the IPv6 address, the HeNB selects the IPv4 or the IPv6 according to an IP version supported by the HeNB, and assigns the transport layer address corresponding to the selected IP version. The transport layer address assigned for each bearer is included in the response. If the HeNB supports the IPv4, the IPv4 is selected. If the HeNB supports the IPv6, the IPv6 is selected. If the HeNB supports both the IPv4 and the IPv6, the HeNB selects the IPv4 or IPv6 according to implementation or O&M configurations.

Although the HeNB receives the IPv4 address and the IPv6 address, after the HeNB selects the transport layer address version, the HeNB transmits uplink data to the SGW according to the uplink TEID assigned by the SGW and the transport layer address assigned by the SGW corresponding to the IP version selected by the HeNB.

The HeNB GW transmits the transport layer address and the downlink TEID assigned by the HeNB for each bearer which are received from the HeNB to the MME.

The MME transmits the SGW the transport layer address and the downlink TEID of each bearer which are received from the HeNB GW.

If the SGW transmits both the IPv4 address and the IPv6 address to the MME, after receiving the downlink transport layer address assigned by the HeNB, the SGW knows the IP version supported or selected by the HeNB. The SGW transmits downlink data according to the downlink TEID and the transport layer address, and receives uplink data according to the TEID assigned by the SGW and the transport layer address assigned by the SGW of the corresponding version.

By using the above method, when the HeNB accesses to the core network through the HeNB GW and when the SAE system includes both a device supporting the IPv4 and a device supporting the IPv6, the user plane bearer may be established correctly and successfully, thereby ensuring interoperability between different manufacturers, and avoiding modifying the MME. In the HeNB architecture, when the user plane data is directly transmitted from the SGW to the HeNB without through the HeNB GW, the merit of the method is more obvious.

Figure 5:
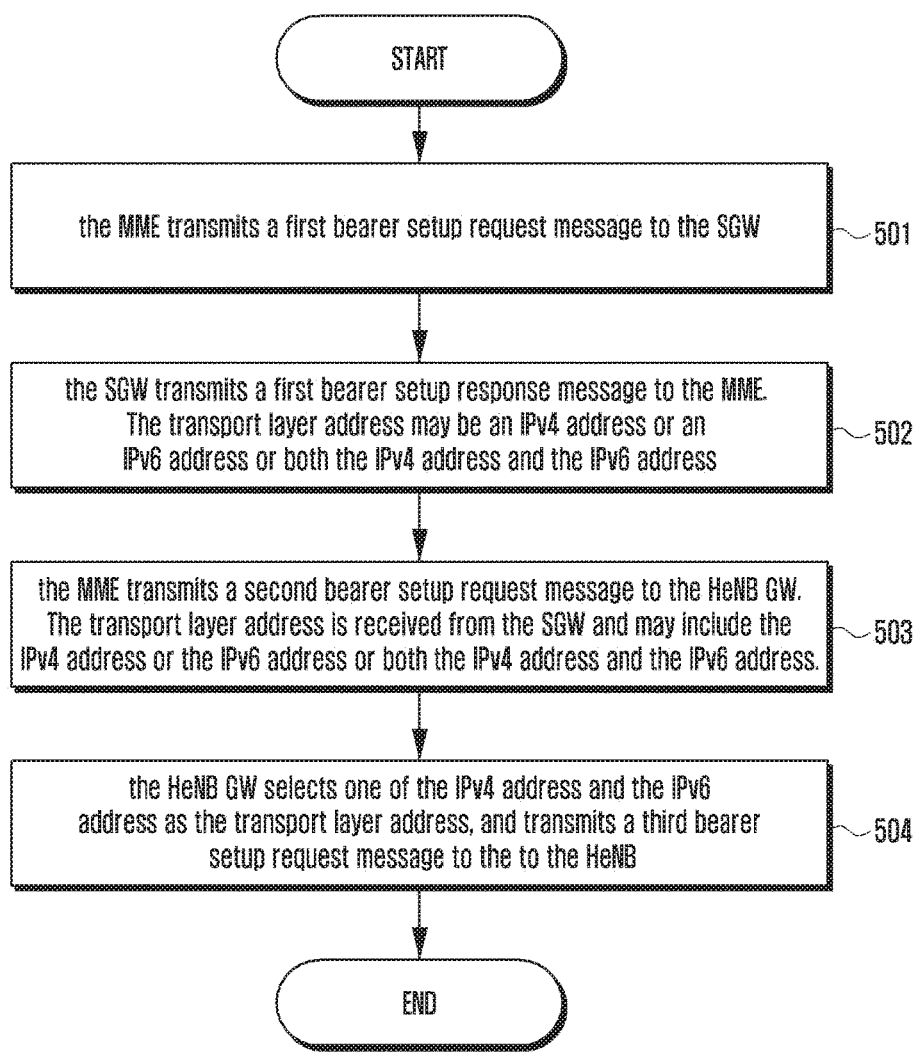
FIG. 5 is a flowchart illustrating a third method for establishing a user plane bearer according to an embodiment of the present disclosure.

FIG. 5 is a flowchart illustrating a third method for establishing a user plane bearer according to an embodiment of the present disclosure.

Referring to FIG. 5, an MME directly transmits an HeNB GW a transport layer address and an uplink TEID assigned by the SGW for each bearer which are received from the SGW. The HeNB GW selects one of the IPv4 and IPv6. The method includes the following processing.

The processing at operations 501 and 502 are the same as the processing at operations 301 and 302 respectively, which are not described herein.

At operation 503, the MME transmits a second bearer setup request message to the HeNB GW. The message includes the uplink transport layer address and TEID assigned by the SGW for each bearer which are received from the SGW. The transport layer address is received from the SGW and may include the IPv4 address or the IPv6 address or both the IPv4 address and the IPv6 address. The second bearer setup request message may be an Initial Context Setup Request or an E-RAB Setup Request, or a Handover Request, or another message for bearer setup request used over an S1 interface.

At operation 504, the HeNB GW selects one of the IPv4 address and the IPv6 address as the transport layer address.

If the transport layer address included in the request message received by the HeNB GW from the MME is the IPv4, and the HeNB GW supports the IPv4, the HeNB GW may assign the transport layer address of the IPv4, and transmits the transport layer address and an uplink TEID assigned for each bearer by the HeNB GW to the HeNB through a third bearer setup request message. If the HeNB GW does not support the IPv4, the HeNB GW transmits a failure response to the MME. The failure response includes a failure reason, e.g., the transport layer address is not supported.

If the transport layer address included in the request message received by the HeNB GW from the MME is the IPv6, and the HeNB GW supports the IPv6, the HeNB GW may assign the transport layer address of the IPv6, and transmits the transport layer address and an uplink TEID assigned for each bearer by the HeNB GW to the HeNB through a third bearer setup request message. If the HeNB GW does not support the IPv6, the HeNB GW transmits a failure response to the MME. The failure response includes a failure reason, e.g., the transport layer address is not supported.

If the transport layer address in the request message received by the HeNB GW from the MME includes both the IPv4 address and the IPv6 address, the HeNB GW selects the IPv4 or the IPv6 according to an IP version supported by the HeNB GW, assigns the transport layer address corresponding to the selected IP version, and transmits the transport layer address and the uplink TEID assigned for each bearer by the HeNB GW to the HeNB through a third bearer setup request message. If the HeNB GW supports the IPv4, the IPv4 is selected. If the HeNB GW supports the IPv6, the IPv6 is selected. If the HeNB GW supports both the IPv4 and the IPv6, the HeNB GW selects the IPv4 or IPv6 according to implementation or O&M configurations.

When selecting one of the IPv4 and IPv6, the HeNB GW may consider IP versions supported by the HeNB and HeNB GW that the UE connected. If the transport layer address in the request message received by the HeNB GW from the MME is the IPv4, and the HeNB and HeNB GW that the UE connected support the IPv4, the HeNB GW assigns the transport layer address of the IPv4, and transmits the transport layer address and the uplink TEID assigned for each bearer by the HeNB GW to the HeNB through the third bearer setup request message. If the HeNB or HeNB GW that the UE connected does not support the IPv4, the HeNB GW transmits a failure response to the MME. The failure response includes a failure reason, e.g., the transport layer address is not supported. If the transport layer address included in the request message received by the HeNB GW from the MME is the IPv6, and the HeNB and HeNB GW that the UE connected support the IPv6, the HeNB GW assigns the transport layer address of the IPv6, and transmits the transport layer address and the uplink TEID assigned for each bearer by the HeNB GW to the HeNB through the third bearer setup request message. If the HeNB or HeNB GW that the UE connected does not support the IPv6, the HeNB GW transmits a failure response to the MME. The failure response includes a failure reason, e.g., the transport layer address is not supported. If the transport layer address included in the request message received by the HeNB GW from the MME includes both the IPv4 address and the IPv6 address, the HeNB GW selects the IPv4 or the IPv6 according to an IP version supported by the HeNB GW, assigns the transport layer address corresponding to the selected IP version, and transmits the transport layer address and the uplink TEID assigned for each bearer by the HeNB GW to the HeNB through the third bearer setup request message. If the HeNB and HeNB GW that the UE connects support the IPv4, the HeNB GW selects the IPv4. If the HeNB and HeNB GW that the UE connected support the IPv6, the HeNB GW selects the IPv6. If the HeNB and HeNB GW that the UE connected support both the IPv4 and the IPv6, the HeNB GW selects the IPv4 or the IPv6 according to implementation or O&M configuration.

In the case of that the user plane data is directly transmitted from the SGW to the HeNB without through the HeNB GW, if the transport layer address included in the request message received by the HeNB GW from the MME is the IPv4, and the HeNB of the UE supports the IPv4, the HeNB GW includes the transport layer address of the IPv4 and the uplink TEID received from the MME into a third bearer setup request message which is transmitted to the HeNB. If the HeNB of the UE does not support the IPv4, the HeNB GW transmits a failure response to the MME. The failure response includes a failure reason, e.g., the transport layer address is not supported. If the transport layer address included in the request message received by the HeNB GW from the MME is the IPv6, and the HeNB of the UE supports the IPv6, the HeNB GW includes the transport layer address of the IPv6 and the uplink TEID received from the MME into a third bearer setup request message which is transmitted to the HeNB. If the HeNB of the UE does not support the IPv6, the HeNB GW transmits a failure response to the MME. The failure response includes a failure reason, e.g., the transport layer address is not supported. If the transport layer address included in the request includes received by the HeNB GW from the MME includes both the IPv4 address and the IPv6 address, the HeNB GW selects the IPv4 or the IPv6 according to an IP version supported by the HeNB of the UE, and includes the transport layer address of the selected IP version and the uplink TEID received from the MME into a third bearer setup request message which is transmitted to the HeNB. If the HeNB of the UE supports the IPv4, the HeNB GW selects the IPv4. If the HeNB of the UE supports the IPv6, the HeNB GW selects the IPv6. If the HeNB of the UE supports both the IPv4 and the IPv6, the HeNB GW selects the IPv4 or the IPv6 according to implementation or O&M configurations.

In the case of that the user plane data is transmitted from the SGW to the HeNB through the HeNB GW, if the HeNB GW supports both the IPv4 and IPv6, the HeNB GW may use different IP versions for the user plane between the HeNB GW and the MME and the user plane between the HeNB GW and HeNB as follows.

When selecting one of the IPv4 address and the IPv6 address for the interface between the HeNB GW and the MME, the HeNB GW may consider IP versions supported by the HeNB GW and MME. If the transport layer address included in the request message received by the HeNB GW from the MME is the IPv4, and the HeNB GW supports the IPv4, the HeNB GW assigns the transport layer address of the IPv4 for downlink. If the HeNB GW does not support the IPv4, the HeNB GW transmits a failure response to the MME. The failure response includes a failure reason, e.g., the transport layer address is not supported. If the transport layer address included in the request message received by the HeNB GW from the MME is the IPv6, and the HeNB GW supports the IPv6, the HeNB GW assigns the transport layer address of the IPv6 for downlink. If the HeNB GW does not support the IPv6, the HeNB GW transmits a failure response to the MME. The failure response includes a failure reason, e.g., the transport layer address is not supported. If the transport layer address included in the request message received by the HeNB GW from the MME includes both the IPv4 address and the IPv6 address, the HeNB GW selects the IPv4 or IPv6 according to an IP version supported by the HeNB GW, assigns the transport layer address corresponding to the selected IP version. If the HeNB GW supports the IPv4, the HeNB GW selects the IPv4. If the HeNB GW supports the IPv6, the HeNB GW selects the IPv6. If the HeNB GW supports both the IPv4 and the IPv6, the HeNB GW selects the IPv4 or IPv6 according to implementation or O&M configurations.

When selecting one of the IPv4 address and the IPv6 address for the interface between the HeNB GW and the HeNB, the HeNB GW may consider IP versions supported by the HeNB GW and HeNB of the UE. If the HeNB GW and HeNB both support the IPv4 only, the HeNB GW selects the IPv4 for the interface. The HeNB GW assigns the uplink transport layer address for the interface and transmits the uplink transport layer address to the HeNB. If the HeNB GW and HeNB both support the IPv6 only, the HeNB GW selects the IPv6 for the interface. The HeNB GW assigns the uplink transport layer address for the interface and transmits the uplink transport layer address to the HeNB. If the HeNB GW and HeNB both support the IPv4 and IPv6, the HeNB GW selects the IPv4 or IPv6 according to implementation or O&M configurations. The HeNB GW assigns the uplink transport layer address for the interface and transmits the uplink transport layer address to the HeNB. The HeNB assigns a downlink transport layer address according to the version of the transport layer address received, and transmits the downlink transport layer address to the HeNB GW.

The third bearer setup request message may be an Initial Context Setup Request or an E-RAB Setup Request, or a Handover Request, or another message for bearer setup request used over an S1 interface.

The HeNB transmits a response to the HeNB GW. The response includes the transport layer address and the downlink TEID assigned by the HeNB for each bearer. If the transport layer address included in the message received by the HeNB from the HeNB GW is the IPv4, and the HeNB supports the IPv4, the HeNB may assign the transport layer address of the IPv4, and transmit the assigned transport layer address to the HeNB GW through the response. If the HeNB GW does not support the IPv4, the HeNB transmits a failure response to the HeNB GW. The failure response includes a failure reason, e.g., the transport layer address is not supported. If the transport layer address included in the message received by the HeNB from the HeNB GW is the IPv6, and the HeNB supports the IPv6, the HeNB may assign the transport layer address of the IPv6, and transmit the assigned transport layer address to the HeNB GW through the response. If the HeNB does not support the IPv6, the HeNB transmits a failure response to the HeNB GW. The failure response includes a failure reason, e.g., the transport layer address is not supported.

In the case of that the user plane data are transmitted directly from the SGW to the HeNB without through the HeNB GW, the HeNB GW transmits the transport layer address and the downlink TEID assigned by the HeNB for each bearer which are received from the HeNB to the MME. The MME transmits the transport layer address and the downlink TEID of each bearer which are received from the HeNB GW to the SGW.

In the case of that the user plane data are transmitted from the SGW to the HeNB through the HeNB GW, the HeNB GW assigns the transport layer address and the downlink TEID (for a user plane interface between the HeNB GW and the SGW) according to the IP version selected at 504, and transmits the downlink TEID and the transport layer address to the MME. The MME transmits the transport layer address and the downlink TEID of each bearer which are received from the HeNB GW to the SGW.

By using the above method, when the HeNB accesses to the core network through the HeNB GW, when the SAE system includes both a device supporting the IPv4 and a device supporting the IPv6, the user plane bearer may be established correctly and successfully, thereby ensuring interoperability between different manufacturers, and avoiding modifying the MME. In the HeNB architecture, when the user plane data is transmitted directly from the SGW to the HeNB without through the HeNB GW, the merit of the method is more obvious.

Figure 6:
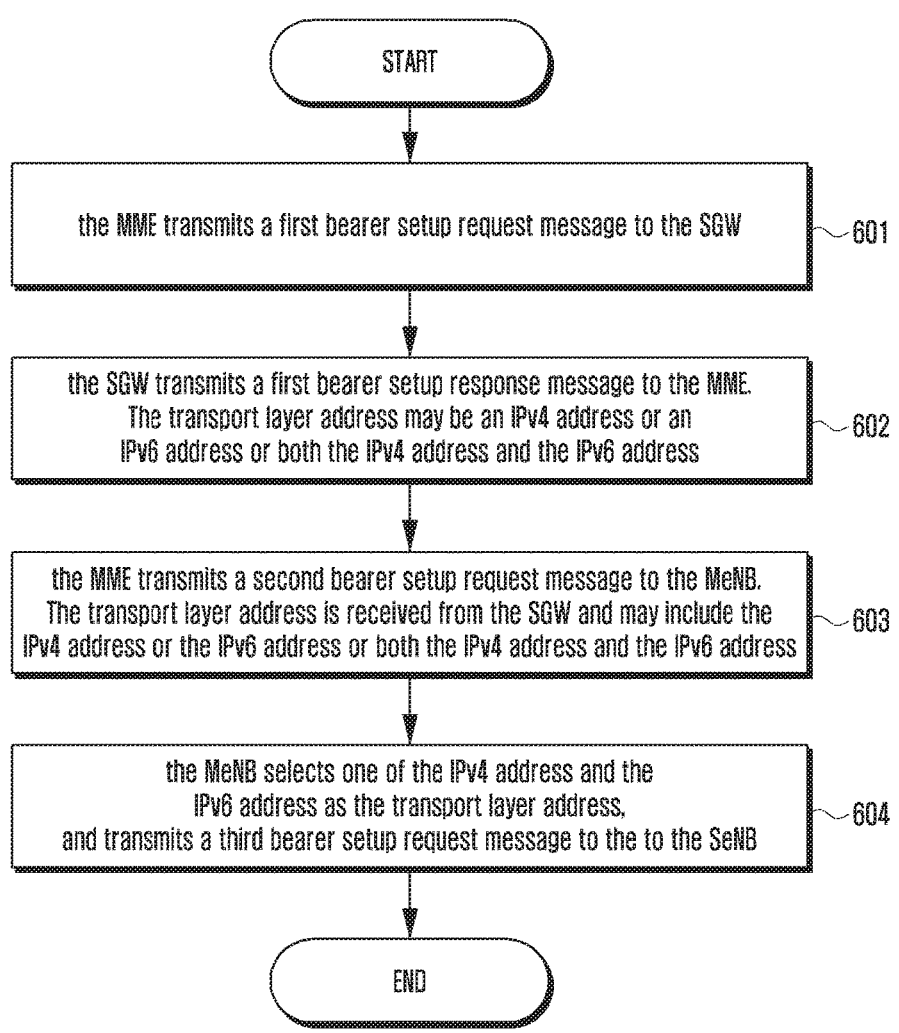
FIG. 6 is a flowchart illustrating a fourth method for establishing a user plane bearer according to an embodiment of the present disclosure.

FIG. 6 is a flowchart illustrating a fourth method for establishing a user plane bearer according to an embodiment of the present disclosure.

Referring to FIG. 6, an MME directly transmits to a master-eNB (MeNB) a transport layer address and an uplink TEID assigned by a SGW for each bearer which are received from the SGW. The MeNB selects one of the IPv4 and IPv6. The method includes the following processing.

The processing at operations 601 and 602 are the same as the processing at operations 301 and 302 respectively, which are not described herein.

At operation 603, the MME transmits a second bearer setup request message to the MeNB. The message includes the transport layer address and the uplink TEID assigned by the SGW for each bearer which are received from the SGW. The transport layer address is received from the SGW and may include the IPv4 address or the IPv6 address or both the IPv4 address and the IPv6 address. The second bearer setup request message may be an Initial Context Setup Request or an E-RAB Setup Request, or a Handover Request, or another message for bearer setup request used over an S1 interface.

At operation 604, the MeNB selects one of the IPv4 address and the IPv6 address as the transport layer address.

If the transport layer address included in the request message received by the MeNB from the MME is the IPv4, and the MeNB supports the IPv4, the MeNB assigns the transport layer address of the IPv4. The MeNB transmits a transport layer address and an uplink TEID assigned by the MeNB for a split bearer to a secondly eNB (SeNB) through a third bearer setup request message. If the MeNB does not support the IPv4, the MeNB transmits a failure response to the MME. The failure response includes a failure reason, e.g., the transport layer address is not supported. If the transport layer address included in the request message received by the MeNB from the MME is the IPv6, and the MeNB supports the IPv6, the MeNB assigns the transport layer address of the IPv6. The MeNB transmits a transport layer address and an uplink TEID assigned by the MeNB for a split bearer to the SeNB through a third bearer setup request message. If the MeNB does not support the IPv6, the MeNB transmits a failure response to the MME. The failure response includes a failure reason, e.g., the transport layer address is not supported.

If the transport layer address included in the request message received by the MeNB from the MME includes both the IPv4 address and the IPv6 address, the MeNB selects the IPv4 or the IPv6 according to an IP version supported by the MeNB, assigns the transport layer address corresponding to the selected IP version, and transmits the transport layer address and an uplink TEID assigned by the MeNB for the split bearer to the SeNB through a third bearer setup request message. If the MeNB supports the IPv4, the IPv4 is selected. If the MeNB supports the IPv6, the IPv6 is selected. If the MeNB supports both the IPv4 and the IPv6, the MeNB selects the IPv4 or the IPv6 according to implementation or O&M configurations.

For the split bearer, when selecting one of the IPv4 and IPv6, the MeNB may consider IP versions supported by the SeNB and MeNB of the UE. If the transport layer address included in the request message received by the MeNB from the MME is the IPv4, and the SeNB and MeNB of the UE support the IPv4, the MeNB assigns the transport layer address of the IPv4, and transmits the transport layer address and an uplink TEID assigned by the MeNB for the split bearer to the SeNB through a third bearer setup request message. If the SeNB or MeNB of the UE does not support the IPv4, the MeNB transmits a failure response to the MME. The failure response includes a failure reason, e.g., the transport layer address is not supported. If the transport layer address included in the request message received by the MeNB from the MME is the IPv6, and the SeNB and MeNB of the UE support the IPv6, the MeNB assigns the transport layer address of the IPv6, and transmits the transport layer address and an uplink TEID assigned by the MeNB for the split bearer to the SeNB through a third bearer setup request message. If the SeNB or MeNB of the UE does not support the IPv6, the MeNB transmits a failure response to the MME. The failure response includes a failure reason, e.g., the transport layer address is not supported. If the transport layer address included in the request message received by the MeNB from the MME includes both the IPv4 address and the IPv6 address, and the MeNB selects the IPv4 or the IPv6 according to IP versions supported by the MeNB and the SeNB of the UE, assigns the transport layer address corresponding to the selected IP version, and transmits the transport layer address and an uplink TEID assigned for the split bearer by the MeNB to the SeNB through a third bearer setup request message. If the SeNB and MeNB of the UE support the IPv4, the MeNB selects the IPv4. If the SeNB and MeNB of the UE support the IPv6, the MeNB selects IPv6. If the SeNB and MeNB of the UE support both the IPv4 and the IPv6, the MeNB selects the IPv4 or the IPv6 according to implementation or O&M configurations.

For a Second Cell Group (SCG) bearer, when selecting one of the IPv4 and IPv6, the MeNB may consider an IP version supported by the SeNB of the UE. If the transport layer address included in the request message received by the MeNB from the MME is the IPv4, and the SeNB of the UE supports the IPv4, the MeNB transmits the transport layer address of the IPv4 received from the MME to the SeNB through a third bearer setup request message. If the SeNB of the UE does not support the IPv4, the MeNB transmits a failure response to the MME. The failure response includes a failure reason, e.g., the transport layer address is not supported. If the transport layer address included in the request message received by the MeNB from the MME is the IPv6, and the SeNB of the UE supports the IPv6, the MeNB transmits the transport layer address of the IPv6 received from the MME to the SeNB through a third bearer setup request message. If the SeNB of the UE does not support the IPv6, the MeNB transmits a failure response to the MME. The failure response includes a failure reason, e.g., the transport layer address is not supported. If the transport layer address included in the request message received by the MeNB from the MME includes both the IPv4 address and the IPv6 address, the MeNB selects the IPv4 or the IPv6 according to an IP version supported by the SeNB of the UE, and transmits the selected transport layer address to the SeNB through a third bearer setup request message. If the SeNB of the UE supports the IPv4, the MeNB selects the IPv4. If the SeNB of the UE supports IPv6, the MeNB selects the IPv6. If the SeNB of the UE supports both the IPv4 and the IPv6, the MeNB selects the IPv4 or the IPv6 according to implementation or O&M configurations.

For the split bearer, if the MeNB supports both the IPv4 and the IPv6, the MeNB may select to use different IP versions for the S1 interface (i.e., the user plane between the MeNB and the SGW) and the X2 interface (i.e., the user plane between the MeNB and the SeNB) as follows.

When selecting one of the IPv4 address and the IPv6 address for the S1 interface, the MeNB may consider an IP version supported by the MeNB. If the transport layer address included in the request message received by the MeNB from the MME is the IPv4, and the MeNB supports the IPv4, the MeNB assigns a downlink transport layer address of the IPv4 for the S1 interface. If the MeNB does not support the IPv4, the MeNB transmits a failure response to the MME. The failure response includes a failure reason, e.g., the transport layer address is not supported. If the transport layer address included in the request message received by the MeNB from the MME is the IPv6, and the MeNB supports the IPv6, the MeNB assigns a downlink transport layer address of the IPv6 for the S1 interface. If the MeNB does not support the IPv6, the MeNB transmits a failure response to the MME. The failure response includes a failure reason, e.g., the transport layer address is not supported. If the transport layer address included in the request message received by the MeNB from the MME includes both the IPv4 address and the IPv6 address, and the MeNB selects the IPv4 or the IPv6 according to an IP version supported by the MeNB, assigns the downlink transport layer address corresponding to the selected IP version. If the MeNB supports the IPv4, the MeNB selects the IPv4. If the MeNB supports the IPv6, the MeNB selects the IPv6. If the MeNB supports both the IPv4 and the IPv6, the MeNB selects the IPv4 or the IPv6 according to implementation or O&M configurations.

When selecting one of the IPv4 address and the IPv6 address for the X2 interface, MeNB may consider IP versions supported by the SeNB and MeNB of the UE. If the SeNB and MeNB both support the IPv4 only, the MeNB selects the IPv4 for the X2 interface. The MeNB assigns an uplink transport layer address for the X2 interface and transmits the uplink transport layer address to the SeNB. If the SeNB and MeNB both support the IPv6 only, the MeNB selects the IPv6 for the X2 interface. The MeNB assigns an uplink transport layer address for the X2 interface and transmits the uplink transport layer address to the SeNB. If the SeNB and MeNB both support the IPv4 and IPv6, the MeNB selects the IPv4 or IPv6 according to implementation or O&M configurations. The MeNB assigns an uplink transport layer address for the X2 interface and transmits the uplink transport layer address to the SeNB. The SeNB assigns a downlink transport layer address for the X2 interface according to the version of the received transport layer address, and transmits the downlink transport layer address to the MeNB.

The MeNB may include the IP version to be used by the SeNB in the third bearer setup request message.

The third bearer setup request message may be a SeNB Addition Request, or a Handover Request, or another message for bearer setup request used over an X2 interface.

The SeNB transmits a response to the MeNB. The response includes the downlink TEID and the transport layer address assigned by the SeNB. The SeNB knows the transport layer address version needed to be assigned according to the IP version to be used included in the request message received from the MeNB or according to the transport layer address of the IPv4 or IPv6 included in the request message received from the MeNB. If the transport layer address needed to be assigned is the IPv4, and the SeNB supports the IPv4, the SeNB may assign the transport layer address of the IPv4, and transmits the transport layer address of the IPv4 to the MeNB through the response. If the SeNB does not support the IPv4, the SeNB transmits a failure response to the MeNB. The failure response includes a failure reason, e.g., the transport layer address is not supported. If the transport layer address needed to be assigned is the IPv6, and the SeNB supports the IPv6, the SeNB may assign the transport layer address of the IPv6, and transmits the transport layer address of the IPv6 to the MeNB through the response. If the SeNB does not support the IPv6, the SeNB transmits a failure response to the MeNB. The failure response includes a failure reason, e.g., the transport layer address is not supported.

For the split bearer, the MeNB assigns the DL TEID of the S1 interface and the transport layer address according to the IP version selected by the MeNB for the S1 interface, and transmits the TEID and the transport layer address of the S1 interface to the MME. The MME transmits the TEID and the transport layer address of the bearer which are received from the MeNB to the SGW.

For the SCG bearer, the MeNB transmits the TEID and the transport layer address of the bearer which are received from the SeNB to the MME. The MME transmits the TEID and the transport layer address of the bearer which are received from the MeNB to the SGW.

By using the above method, when the SAE system includes both a device supporting the IPv4 and a device supporting the IPv6, the user plane bearer may be established correctly and successfully, thereby ensuring interoperability between different manufacturers, and avoiding modifying the MME.

Figure 7:
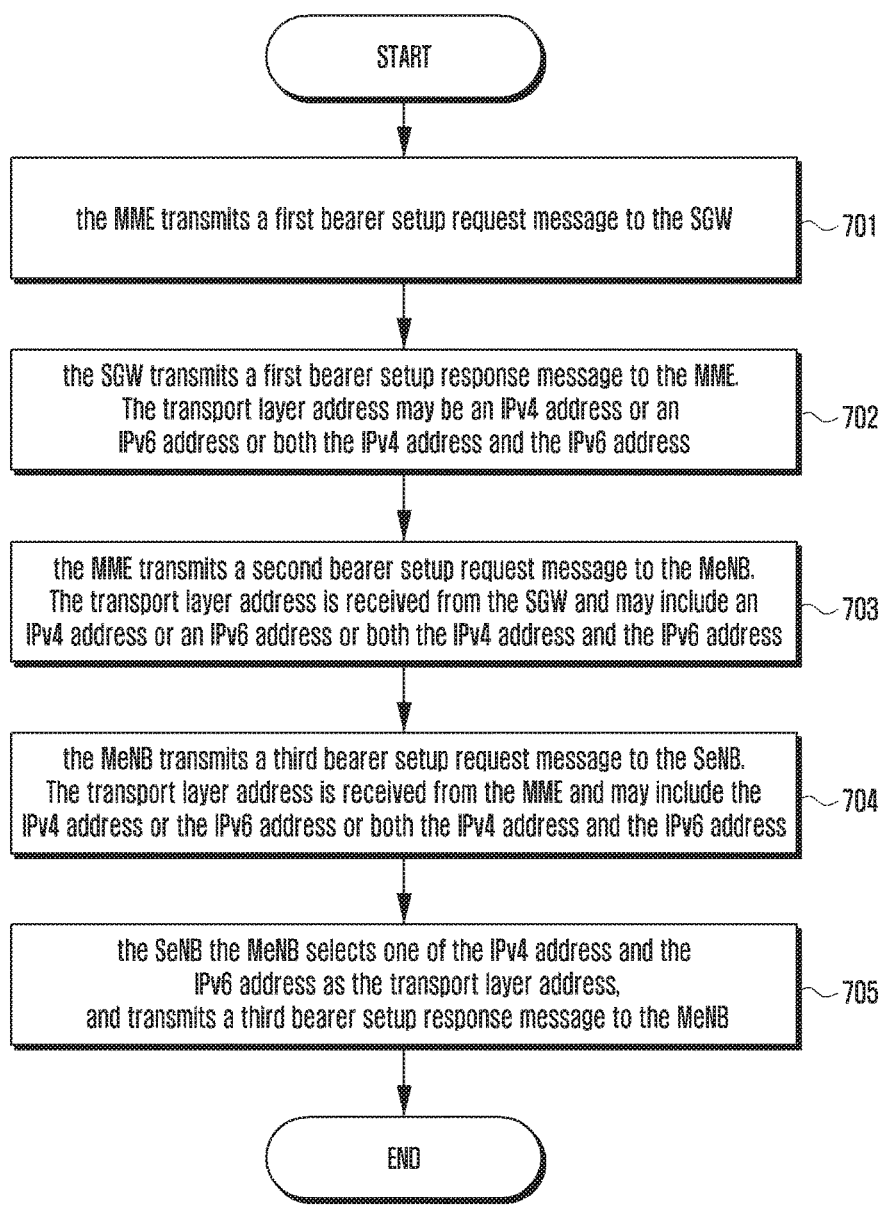
FIG. 7 is a flowchart illustrating a fifth method for establishing a user plane bearer according to an embodiment of the present disclosure.

FIG. 7 is a flowchart illustrating a fifth method for establishing a user plane bearer according to an embodiment of the present disclosure.

Referring to FIG. 7, an MME directly transmits to an MeNB a transport layer address and an uplink TEID assigned by a SGW for each bearer which are received from the SGW. The MeNB transmits to an SeNB the transport layer address and the uplink TEID assigned by the SGW for each bearer which are received from the MME. The SeNB selects one of the IPv4 and IPv6. The method includes the following processing.

The processing at operations 701 and 702 are the same as the processing at operations 301 and 302 respectively, which are not described herein.

At operation 703, the MME transmits a second bearer setup request message to the MeNB. The message includes the transport layer address and the uplink TEID assigned by the SGW for each bearer which are received from the SGW. The transport layer address is received from the SGW and may include an IPv4 address or an IPv6 address or both the IPv4 address and the IPv6 address. The second bearer setup request message may be an Initial Context Setup Request or an E-RAB Setup Request, or a Handover Request, or another message for bearer setup request used over an S1 interface.

At operation 704, the MeNB transmits a third bearer setup request message to the SeNB. For the SCG bearer, the message includes the uplink TEID and the transport layer address received from the MME. The transport layer address is received from the MME and may include the IPv4 address or the IPv6 address or both the IPv4 address and the IPv6 address.

The third bearer setup request message may be a SeNB Addition Request, or a Handover Request, or another message for bearer setup request used over an X2 interface.

At operation 705, the SeNB transmits a response to the MeNB. The response includes a transport layer address and a downlink TEID assigned by the SeNB.

If the transport layer address included in the request message received by the SeNB from the MeNB is the IPv4, and the SeNB supports the IPv4, the SeNB assigns the transport layer address of the IPv4, and transmits the transport layer address to the MeNB through the response. If the SeNB does not support the IPv4, the SeNB transmits a failure response to the MeNB. The failure response includes a failure reason, e.g., the transport layer address is not supported. If the transport layer address included in the request message received by the SeNB from the MeNB is the IPv6, and the SeNB supports the IPv6, the SeNB assigns the transport layer address of the IPv6, and transmits the transport layer address to the MeNB through the response. If the SeNB does not support the IPv6, the SeNB transmits a failure response to the MeNB. The failure response includes a failure reason, e.g., the transport layer address is not supported. If the transport layer address included in the request received by the SeNB includes both the IPv4 address and the IPv6 address, the SeNB selects the IPv4 or the IPv6 according to an IP version supported by the SeNB, assigns the transport layer address corresponding to the selected IP version. If the SeNB supports the IPv4, the IPv4 is selected. If the SeNB supports the IPv6, the IPv6 is selected. If the SeNB supports both the IPv4 and the IPv6, the SeNB selects the IPv4 or the IPv6 according to implementation or O&M configurations.

For the split bearer, when selecting one of the IPv4 and IPv6, the SeNB may consider IP versions supported by the SeNB and MeNB. If the transport layer address included in the request message received by the SeNB from the MeNB is IPv4, and the SeNB and MeNB both support the IPv4, the SeNB assigns the transport layer address of the IPv4, and transmits the transport layer address of the IPv4 to the MeNB through the response. If the SeNB or MeNB does not support the IPv4, the SeNB transmits a failure response to the MeNB. If the transport layer address included in the request message received by the SeNB from the MeNB is the IPv6, and the SeNB and MeNB supports the IPv6, the SeNB assigns the transport layer address of the IPv6, and transmits the transport layer address of the IPv6 to the MeNB through the response. If the SeNB or MeNB does not support the IPv6, the SeNB transmits a failure response to the MeNB. The failure response includes a failure reason, e.g., the transport layer address is not supported. If the transport layer address included in the request message received by the SeNB from the MeNB includes both the IPv4 address and the IPv6 address, the SeNB selects the IPv4 or the IPv6 according to IP versions supported by the MeNB and the SeNB, assigns the transport layer address corresponding to the selected IP version. If the SeNB and MeNB both support the IPv4, the SeNB selects the IPv4. If the SeNB and MeNB both support the IPv6, the SeNB selects the IPv6. If the SeNB and MeNB support both the IPv4 and the IPv6, the SeNB selects the IPv4 or the IPv6 according to implementation or O&M configurations.

Although both the IPv4 address and the IPv6 address are received, after selecting the transport layer address version, the SeNB transmits uplink data to the SGW according to the uplink TEID assigned by the SGW and the transport layer address corresponding to the IP address selected by the SeNB.

For the split bearer, the MeNB assigns the TEID and the transport layer address of the S1 interface according to the IP version selected by the MeNB for the S1 interface, and transmits the TEID and the transport layer address of the S1 interface to the MME. The MME transmits the TEID and the transport layer address of the bearer which are received from the MeNB to the SGW.

For the SCG bearer, the MeNB transmits the TEID and the transport layer address of the bearer which are received from the SeNB to the MME. The MME transmits the TEID and the transport layer address of the bearer which are received from the MeNB to the SGW.

If the SGW transmits the IPv4 address and the IPv6 address to the MME at the same time, the SGW knows the IP version supported or selected by the eNB after receiving the downlink transport layer address. When transmitting downlink data, the SGW transmits the downlink data through the downlink TEID and the transport layer address. When receiving uplink data, the SGW receives the uplink data through the TEID assigned by the SGW and the transport layer address of the corresponding version.

By using the above method, when the SAE system includes both a device supporting the IPv4 and a device supporting the IPv6, the user plane bearer may be established correctly and successfully, thereby ensuring interoperability between different manufacturers, and avoiding modifying the MME.

Figure 8:
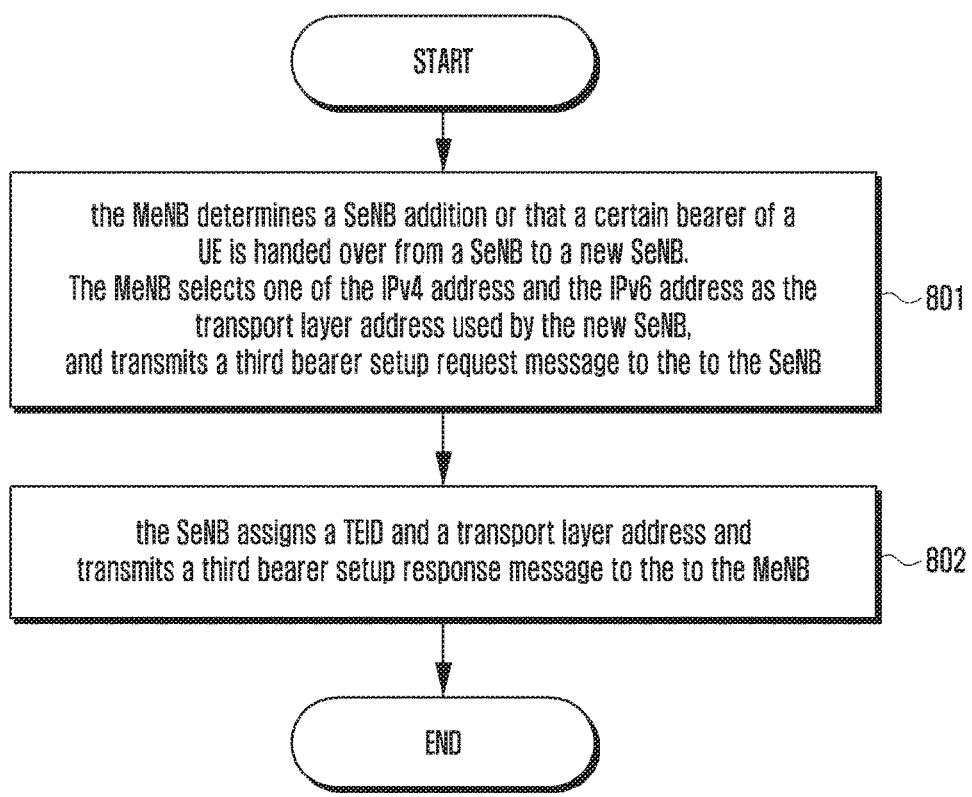
FIG. 8 is a flowchart illustrating a sixth method for establishing a user plane bearer according to an embodiment of the present disclosure.

FIG. 8 is a flowchart illustrating a sixth method for establishing a user plane bearer according to an embodiment of the present disclosure.

Referring to FIG. 8, in a Dual connectivity (DC) scenario, a bearer was established on a MeNB or a SeNB, the bearer needs to be changed from the MeNB to the SeNB or changed from the SeNB to a new SeNB. The MeNB selects an IPv4 or an IPv6 of a transport layer address of a user plane of the new SeNB. The user plane of the new SeNB may be an interface between the new SeNB and the SGW (for the SCG bearer) or an interface between the SeNB and the MeNB (for the split bearer). The method includes the following processing.

At operation 801, the MeNB determines a SeNB addition or that a certain bearer of a UE is handed over from a SeNB to a new SeNB. For the bearer to be handed over, if a transport layer address received by the MeNB from an MME in a process of establishing the bearer initially includes only the IPv4 (or IPv6), and a target SeNB of the handover also supports the IPv4 (or IPv6), the bearer can be established in the target SeNB. The MeNB selects to use the transport layer address of the IPv4 (or IPv6) between the target SeNB and the SGW.

For the SCG bearer to be handed over, the MeNB may select the IP version between the source MeNB and the SGW or the IP version between the source SeNB and the SGW to be used between the target eNB and the SGW, and informs the target SeNB of the IP version to be used. The MeNB may inform the target SeNB of the IP version to be used by an information element, or implicitly inform the target SeNB of the IP version to be used by using the uplink TEID and the transport layer address. If the transport layer address is the IPv4, the target SeNB needs to assign a transport layer address of the IPv4. If the transport layer address is the IPv6, the target SeNB needs to assign a transport layer address of the IPv6.

For the split bearer, the MeNB may select an IP version of transport layer address between the MeNB and the target SeNB, which is the same as the IP version used between the MeNB and the SGW. The MeNB may inform the target SeNB of the IP version to be used by an information element, or implicitly inform the target SeNB of the IP version to be used by using the uplink TEID and the transport layer address. If the transport layer address is the IPv4, the target SeNB needs to assign a transport layer address of the IPv4 for data forwarding. If the transport layer address is the IPv6, the target SeNB needs to assign a transport layer address of the IPv6 for data forwarding.

For the bearer to be handed over, if the transport layer address received by the MeNB from the MME in the process of establishing the bearer initially includes both the IPv4 address and the IPv6 address, for the SCG bearer, the MeNB selects an IP version to be used for an interface between the target SeNB and the SGW according to an IP version supported by the target SeNB. If the target SeNB supports the IPv4, the MeNB selects the IPv4. If the target SeNB supports the IPv6, the MeNB selects the IPv6. If the target SeNB supports both the IPv4 and the IPv6, the MeNB selects the IPv4 or the IPv6 according to implementation or O&M configurations. If the target SeNB supports both the IPv4 and the IPv6, the MeNB may select the IP version used between the source MeNB and the SGW or the IP version used between the source SeNB and the SGW.

For the bearer to be handed over, if the transport layer address received by the MeNB from an MME in a process of establishing the bearer initially includes both the IPv4 address and the IPv6 address, the MeNB selects the IP version to be used for an interface between the target SeNB and the MeNB according to the IP version supported by the target SeNB and the MeNB. If the target SeNB and MeNB support the IPv4, the MeNB selects the IPv4. If the target SeNB and MeNB support the IPv6, the MeNB selects the IPv6. If the target SeNB and MeNB support both the IPv4 and the IPv6, the MeNB may select the IPv4 or IPv6 according to implementation or O&M configurations. If the target SeNB supports both the IPv4 and the IPv6, the MeNB may select the IP version used between the MeNB and the SGW.

Although both the IPv4 address and the IPv6 address are received, after selecting the transport layer address version, the MeNB transmits uplink data to the SGW according to the uplink TEID assigned by the SGW and the transport layer address corresponding to the IP address version selected by the MeNB.

The MeNB transmits a third bearer setup request message to the target SeNB. The message includes the uplink TEID and the transport layer address corresponding to the IP version selected by the MeNB. Or the MeNB directly includes the IP version to be used by the target SeNB in the request message.

The third bearer setup request message may be a SeNB Addition Request or a Handover Request, or another message for bearer setup request used over an X2 interface.

At operation 802, the target SeNB transmits a response to the MeNB. The response includes a downlink TEID and a transport layer address assigned by the target SeNB. The target SeNB knows the IP version of the transport layer address to be assigned according to the IP version to be used included in the message received from the MeNB or according to the IPv4 or IPv6 included in the request message received from the MeNB.

If the transport layer address to be assigned is the IPv4, and the target SeNB supports the IPv4, the target SeNB assigns the transport layer address of the IPv4, and transmits the assigned transport layer address to the MeNB through the response. If the target SeNB does not support the IPv4, the target SeNB transmits a failure response to the MeNB. The failure response includes a failure reason, e.g., the transport layer address is not supported. If the transport layer address to be assigned is the IPv6, and the target SeNB supports the IPv6, the target SeNB assigns the transport layer address of the IPv6, and transmits the assigned transport layer address to the MeNB through the response. If the target SeNB does not support the IPv6, the target SeNB transmits a failure response to the MeNB. The failure response includes a failure reason, e.g., the transport layer address is not supported.

For the SCG bearer, the MeNB transmits the TEID and the transport layer address of the bearer which are received from the SeNB to the MME. The MME transmits the TEID and the transport layer address of the bearer which are received from the MeNB to the SGW. If the IP version is changed during the handover, for example, the IP version is changed from the IPv4 to the IPv6, when receiving uplink data, the SGW receives the uplink data through the transport layer address corresponding to the new IP version. When transmitting downlink data, the SGW transmits the downlink data through the transport layer address and the new TEID.

If the SGW transmits both the IPv4 address and the IPv6 address to the MME, after the SGW receives the downlink transport layer address, the SGW knows the IP version supported or selected by the eNB. When transmitting downlink data, the SGW transmits the downlink data through the downlink TEID and the transport layer address. When receiving uplink data, the SGW receives the uplink data through the TEID assigned by the SGW and the transport layer address of the corresponding version.

By using the above method, when the SAE system includes both a device supporting the IPv4 and a device supporting the IPv6, the user plane bearer may be established correctly and successfully, thereby ensuring interoperability between different manufacturers, and avoiding modifying the MME.

Figure 9:
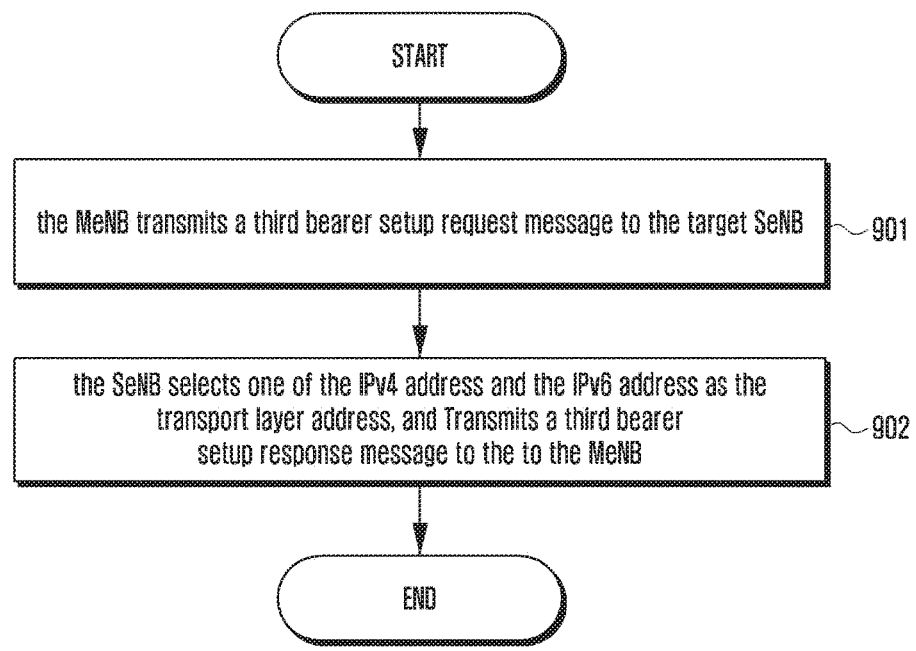
FIG. 9 is a flowchart illustrating a seventh method for establishing a user plane bearer according to an embodiment of the present disclosure.

FIG. 9 is a flowchart illustrating a seventh method for establishing a user plane bearer according to an embodiment of the present disclosure.

Referring to FIG. 9, in a DC scenario, a bearer has been established on a MeNB or a SeNB, the bearer needs to be changed from the MeNB to the SeNB or changed from the SeNB to a new SeNB. The new SeNB selects an IPv4 or an IPv6 of a transport layer address of a user plane of the new SeNB. The user plane of the new SeNB may be an interface between the new SeNB and the SGW (for the SCG bearer) or an interface between the new SeNB and the MeNB (for the split bearer). The method includes the following processing.

At operation 901, the MeNB transmits a third bearer setup request message to the target SeNB. For the SCG bearer to be handed over, the message includes an uplink TEID and a transport layer address of the bearer received by the MeNB from an MME in a process of establishing the bearer initially. The transport layer address is received from the MME which may be an IPv4 address or an IPv6 address or both the IPv4 address and the IPv6 address.

The third bearer setup request message may be a SeNB Addition Request or a Handover Request, or another message for bearer setup request used over an X2 interface.

At operation 902, the target SeNB selects the IPv4 or the IPv6 as an IP version to be used between the target SeNB and the SGW or between the target SeNB and the MeNB.

If the transport layer address included in the request message received by the target SeNB from the MeNB is the IPv4, and the target SeNB supports the IPv4, the target SeNB assigns the transport layer address of the IPv4. If the target SeNB does not support the IPv4, the target SeNB transmits a failure response to the MeNB. The failure response includes a failure reason, e.g., the transport layer address is not supported.

If the transport layer address included in the request message received by the target SeNB from the MeNB is the IPv6, and the target SeNB supports the IPv6, the target SeNB assigns the transport layer address of the IPv6. If the target SeNB does not support the IPv6, the target SeNB transmits a failure response to the MeNB. The failure response includes a failure reason, e.g., the transport layer address is not supported.

If the transport layer address included in the request message received by the target SeNB from the MeNB includes both the IPv4 address and the IPv6 address, the target SeNB selects the IPv4 or IPv6 according to an IP version supported by the target SeNB, assigns the transport layer address corresponding to the selected IP version. If the target SeNB supports the IPv4, the IPv4 is selected. If the target SeNB supports the IPv6, the IPv6 is selected. If the target SeNB supports both the IPv4 and the IPv6, the target SeNB selects the IPv4 or the IPv6 according to implementation or O&M configurations.

For the split bearer, when selecting one of the IPv4 and the IPv6, the target SeNB may consider the IP versions supported by the target SeNB and the MeNB. If the transport layer address included in the message received by the target SeNB from the MeNB is the IPv4, and the target SeNB and the MeNB support the IPv4, the target SeNB assigns the transport layer address of the IPv4. If the target SeNB or the MeNB does not support the IPv4, the target SeNB transmits a failure response to the MeNB. The failure response includes a failure reason, e.g., the transport layer address is not supported. If the transport layer address included in the message received by the target SeNB from the MeNB is the IPv6, and the target SeNB and the MeNB support the IPv6, the target SeNB assigns the transport layer address of the IPv6. If the target SeNB or the MeNB does not support the IPv6, the target SeNB transmits a failure response to the MeNB. The failure response includes a failure reason, e.g., the transport layer address is not supported. If the transport layer address included in the message received by the target SeNB from the MeNB includes both the IPv4 address and the IPv6 address, the target SeNB selects the IPv4 or the IPv6 according to IP versions supported by the MeNB and the target SeNB, assigns the transport layer address corresponding to the selected IP versions. If the target SeNB and the MeNB support the IPv4, the target SeNB selects the IPv4. If the target SeNB and the MeNB support the IPv6, the target SeNB selects the IPv6. If the target SeNB and MeNB support both the IPv4 and the IPv6, the target SeNB selects the IPv4 or the IPv6 according to implementation or O&M configurations.

For the split bearer, when selecting one of the IPv4 and IPv6, the target SeNB may consider the IP versions supported by the target SeNB and MeNB. If the target SeNB and MeNB support the IPv4, the target SeNB selects the IPv4. If the target SeNB and MeNB support the IPv6, the target SeNB selects IPv6. If the target SeNB and MeNB support both the IPv4 and the IPv6, the target SeNB selects the IPv4 or IPv6 according to implementation or O&M configurations.

The target SeNB transmits a third bearer setup response message to the MeNB. The message includes the downlink TEID and the transport layer address of the corresponding IP version assigned by the target SeNB.

The third bearer setup response message may be a SeNB Addition Request Acknowledge, or a Handover Request Acknowledge, or another message for bearer setup response used over the X2 interface.

For the SCG bearer, the MeNB transmits the TEID and the transport layer address of the bearer which are received from the target SeNB to the MME. The MME transmits the TEID and the transport layer address of the bearer to the SGW. If the IP version is changed during the handover, for example, the IP version is changed from the IPv4 to the IPv6, when receiving uplink data, the SGW receives the uplink data through the transport layer address corresponding to the new IP version. When transmitting downlink data, the SGW transmits the downlink data through the new TEID and the transport layer address.

By using the above method, when the SAE system includes both a device supporting the IPv4 and a device supporting the IPv6, the user plane bearer may be established correctly and successfully, thereby ensuring interoperability between different manufacturers, and avoiding modifying the MME.

Figure 10:
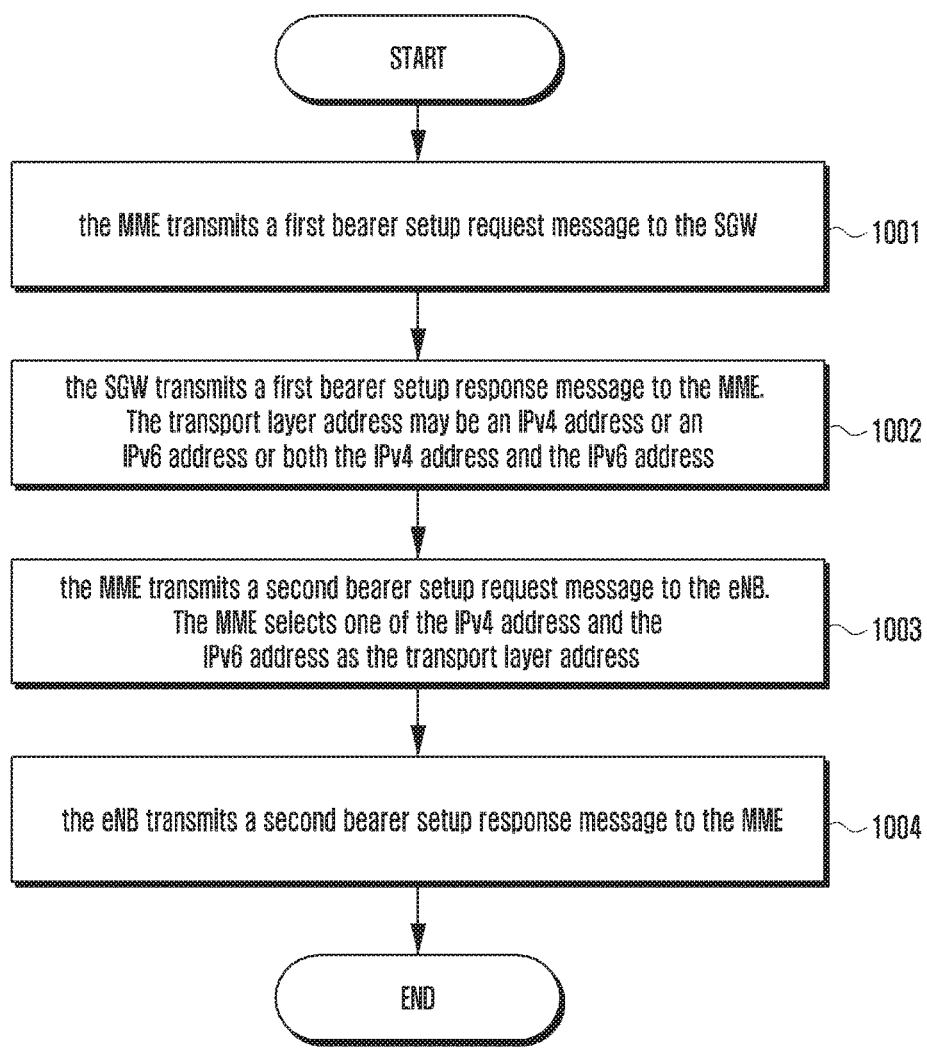
FIG. 10 is a flowchart illustrating an eighth method for establishing a user plane bearer according to an embodiment of the present disclosure.

FIG. 10 is a flowchart illustrating an eighth method for establishing a user plane bearer according to an embodiment of the present disclosure.

Referring to FIG. 10, after an MME receives a transport layer address and an uplink TEID assigned by a SGW for each bearer which are received from the SGW, the MME selects one of the IPv4 and IPv6. The method includes the following processing.

The processing at operations 1001 and 1002 are the same as the processing at operations 301 and 302 respectively, which are not described herein.

At operation 1003, if the transport layer address received by the MME from the SGW is the IPv4, and an eNB accessed by the UE supports the IPv4, the MME triggers to establish a user plane bearer based on the IPv4 between the eNB and the SGW. If the transport layer address received by the MME from the SGW is the IPv6, and the eNB accessed by the UE supports the IPv6, the MME triggers to establish a user plane bearer based on the IPv6 between the eNB and the SGW. If the transport layer address received by the MME from the SGW is the IPv4 (or IPv6), and the eNB accessed by the UE does not support the IPv4 (or IPv6), the establishing of the user plane is failed.

If the transport layer address received by the MME from the SGW includes both the IPv4 address and the IPv6 address, the MME selects the IPv4 or the IPv6 according to an IP version supported by the eNB accessed by the UE. If the eNB accessed by the UE supports the IPv4, the MME selects the IPv4. If the eNB accessed by the UE supports the IPv6, the MME selects the IPv6. If the eNB accessed by the UE supports both the IPv4 and the IPv6, the MME selects the IPv4 or the IPv6 according to implementation or O&M configurations.

For the macro eNB or an HeNB connected to the MME directly, the MME may determine the IP version supported by the eNB according to a process of establishing a Stream Control Transmission Protocol (SCTP) association between the MME and the eNB.

Figure 11:
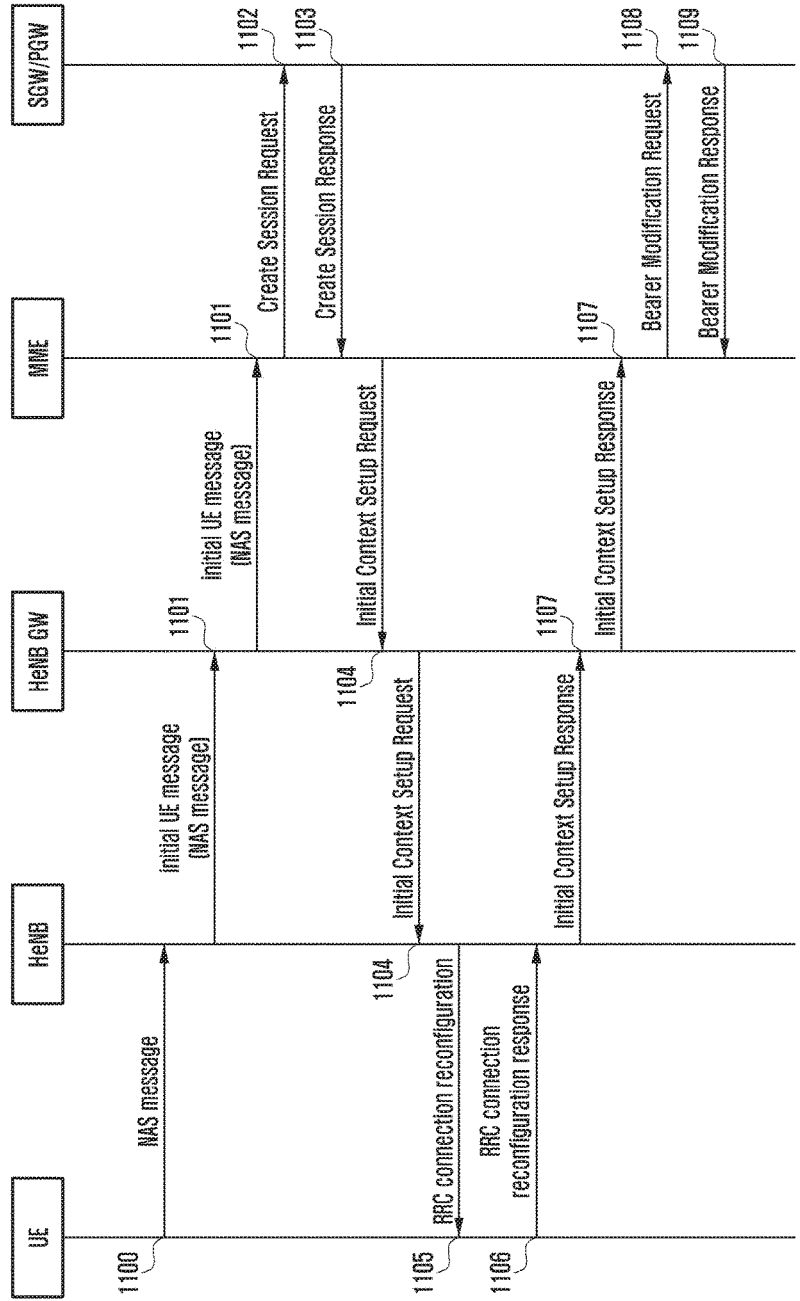
FIG. 11 is a flowchart illustrating a first procedure of obtaining by a mobile management entity (MME) an internet protocol IP) version supported by an evolved Node B (eNB) of a user equipment (UE) according to an eighth method for establishing a user plane bearer of the present disclosure.
Figure 12:
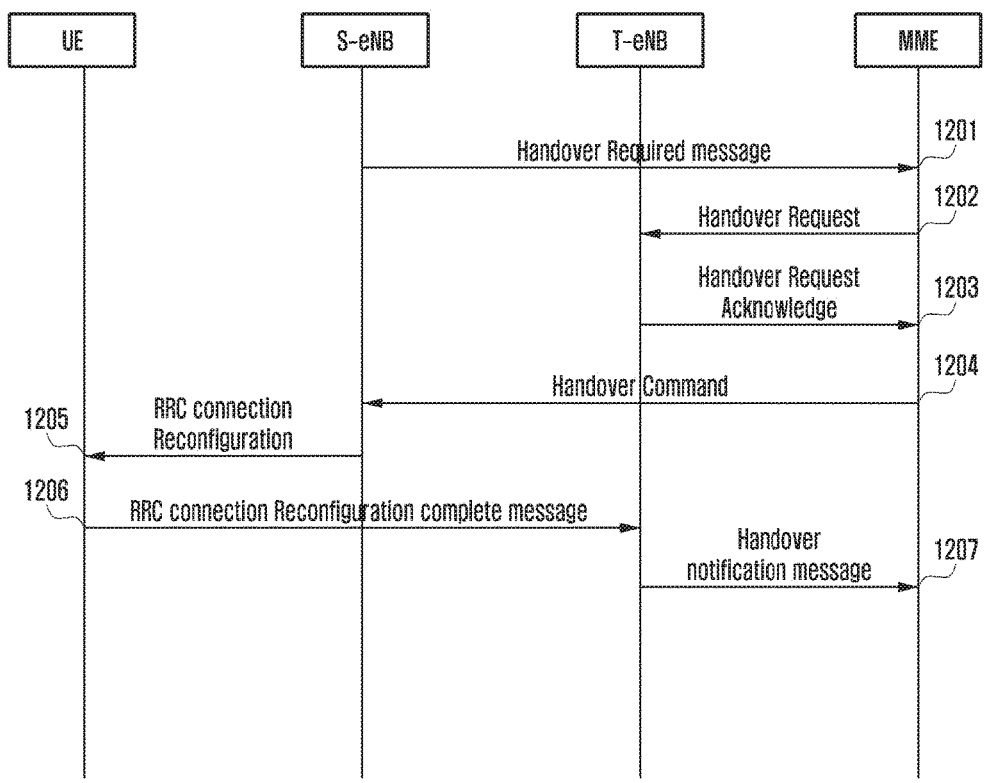
FIG. 12 is a flowchart illustrating a second procedure of obtaining by an MME an IP version supported by an eNB of a UE according to an eighth method for establishing a user plane bearer of the present disclosure.

For the HeNB connected to the MME through the HeNB GW, the MME may determine the IP version supported by the HeNB according to the various embodiments in FIGS. 11 and 12.

For the DC scenario, the MME may determine the IP version supported by the MeNB according to a process of establishing an SCTP association between the MME and the MeNB. The MeNB may inform the MME of the IP version supported by the SeNB.

The MME transmits a second bearer setup request message to the eNB. The message includes the uplink TEID assigned by the SGW for each bearer and the transport layer address selected by the MME which are received from the SGW. The transport layer address may include the IPv4 or the IPv6. The second bearer setup request message may be an Initial Context Setup Request, or an E-RAB Setup Request, or a Handover Request, or another message for bearer setup request used over an S1 interface.

If the HeNB accessed by the UE accesses to the MME through the HeNB GW, the MME transmits a second bearer setup request message to the HeNB GW. The message includes the uplink TEID assigned by the SGW for each bearer and the transport layer address selected by the MME which are received from the SGW. The transport layer address may be the IPv4 address or the IPv6 address. The second bearer setup request message may be an Initial Context Setup Request, or an E-RAB Setup Request, or a Handover Request, or another message for bearer setup request used over an S1 interface. The HeNB GW transmits a third bearer setup request message to the HeNB. If the user plane data does not need to be transmitted through the HeNB GW, the HeNB GW includes the transport layer address and the uplink TEID received from the MME into the third bearer setup request message. If the user plane data needs to be transmitted through the HeNB GW, the HeNB GW assigns the uplink transport layer address and TEID between the HeNB GW and the HeNB, and transmits the assigned uplink transport layer address and TEID to the HeNB. The third bearer setup request message may be an Initial Context Setup Request, or an E-RAB Setup Request, or a Handover Request, or another message for bearer setup request used over an S1 interface.

At operation 1004, the eNB transmits a second bearer setup response message to the MME. The eNB assigns a downlink TEID and a transport layer address and includes the downlink TEID and the transport layer into the response. If the transport layer address included in the request message received by the eNB from the MME is the IPv4, and the eNB supports the IPv4, the eNB assigns the transport layer address of the IPv4. If the eNB does not support the IPv4, the eNB transmits a failure response to the MME. The failure response includes a failure reason, e.g., the transport layer address is not supported. If the transport layer address included in the request message received by the eNB from the MME is the IPv6, and the eNB supports the IPv6, the eNB assigns the transport layer address of the IPv6. If the eNB does not support the IPv6, the eNB transmits a failure response to the MME. The failure response includes a failure reason, e.g., the transport layer address is not supported.

If the HeNB accessed by the UE access to the MME through the HeNB GW, the HeNB transmits a response to the HeNB GW. The response includes the downlink transport layer address and TEID assigned by the eNB for each bearer. If the transport layer address included in the request message received by the eNB from the HeNB GW is the IPv4, and the eNB supports the IPv4, the eNB assigns the transport layer address of the IPv4, and transmits the transport layer address of the IPv4 to the HeNB GW through the response. If the eNB does not support the IPv4, the eNB transmits a failure response to the HeNB GW. The failure response includes a failure reason, e.g., the transport layer address is not supported. If the transport layer address included in the request message received by the eNB from the HeNB GW is the IPv6, and the eNB supports the IPv6, the eNB assigns the transport layer address of the IPv6, and transmits the transport layer address of the IPv6 to the HeNB GW through the response. If the eNB does not support the IPv6, the eNB transmits a failure response to the HeNB GW. The failure response includes a failure reason, e.g., the transport layer address is not supported. The HeNB GW transmits a second bearer setup response message to the MME. If user plane data needs to be transmitted through the HeNB GW, the HeNB GW assigns a downlink TEID and a transport layer address for an interface between the HeNB GW and the SGW, and transmits the downlink TEID and the transport layer address to the MME. If the user plane data does not need to be transmitted through the HeNB GW, the HeNB GW transmits the downlink TEID and the transport layer address which are received from the HeNB to the MME.

The MME transmits the downlink TEID and the transport layer address of each bearer which are received from the eNB or the HeNB GW to the SGW.

If the SGW transmits the IPv4 address and the IPv6 address to the MME at the same time, the SGW knows the IP version supported or selected by the eNB after receiving the downlink transport layer address. When transmitting downlink data, the SGW transmits the downlink data through the downlink TEID and the transport layer address. When receiving uplink data, the SGW receives the uplink data through the TEID assigned by the SGW and the transport layer address corresponding to the DL IP version assigned by the SGW.

By using the above method, when the SAE system includes both a device supporting the IPv4 and a device supporting the IPv6, the user plane bearer may be established correctly and successfully, thereby ensuring interoperability between different manufacturers, and avoiding modifying the MME.

FIG. 11 is a flowchart illustrating a first procedure of obtaining by an MME an IP version supported by an eNB accessed by a UE according to an eighth method for establishing a user plane bearer of the present disclosure.

Referring to FIG. 11, at operation 1100, the UE transmits a NAS message e.g., an Attach Request, through an RRC message, to the HeNB.

At operation 1101, the HeNB transmits a NAS message, e.g., an Attach Request, through an S1 initial UE Message to the HeNB GW. For the UE in active mode, the HeNB may transmit the received NAS message through an S1 uplink NAS transmission message to the HeNB GW. The initial UE message or the uplink NAS transmission message includes an IP version supported by the HeNB. The HeNB GW transmits an initial UE message or an uplink NAS transmission message to the MME. The initial UE message or the uplink NAS transmission message includes the IP version supported by the HeNB. The MME stores the received IP version supported by the HeNB.

At operation 1102, the MME transmits a Create Session Request to a SGW/PGW. If the SGW and the PGW are separated, the signaling process between the SGW and the PGW is omitted herein.

At operation 1103, the SGW/PGW transmits a Create Session Response to the MME. The Create Session Response includes a transport layer address and an uplink TEID of an S1 interface assigned by the SGW for each bearer of the UE. The transport layer address may include IPv4 and/or IPv6.

At operation 1104, the MME selects the IPv4 or the IPv6 for the transport layer address of the user plane according to the stored IP version supported by the HeNB. The processing is the same as that at 1003, and is not described herein.

The MME transmits the Initial Context Setup Request to the HeNB through the HeNB GW. The Initial Context Setup Request includes the transport layer address and the uplink TEID of the S1 interface assigned by the SGW for each bearer of the UE. The transport layer address is selected by the MME which may be IPv4 or IPv6.

If user plane data does not need to be transmitted through the HeNB GW, the message transmitted by the HeNB GW to the HeNB includes the transport layer address and the uplink TEID assigned by the SGW for each bearer of the UE. The transport layer address is selected by the MME which may be IPv4 or IPv6. If the user plane data needs to be transmitted through the HeNB GW, the HeNB GW assigns an uplink transport layer address and TEID between the HeNB GW and the HeNB. The HeNB GW assigns the uplink transport layer address between the HeNB GW and the HeNB according to the version of the transport layer address in the message received from the MME.

The processing at operations 1105 and 1106 are the same as the processing at operations 205 and 206 respectively, which are not described herein.

At operation 1107, the HeNB transmits an Initial Context Setup Response to the MME through the HeNB GW. The HeNB assigns a downlink TEID and transport layer address. The HeNB assigns the transport layer address according to the version of the transport layer address received at operation 1104. The HeNB transmits the assigned TEID and the transport layer address to the HeNB GW.

If the user plane data does not need to be transmitted through the HeNB GW, the message transmitted by the HeNB GW to the MME includes the downlink transport layer address and TEID of the S1 interface assigned by the HeNB for each bearer of the UE. If the user plane data needs to be transmitted through the HeNB GW, the message transmitted by the HeNB GW to the MME includes a downlink TEID and a transport layer address of an interface between the HeNB GW and the SGW which are assigned by the HeNB GW for each bearer of the UE. The HeNB GW assigns the transport layer address according to the version of the IP address in the received message.

The processing at operations 1108 and 1109 are the same as the processing at operations 210 and 211 respectively, which are not described herein.

FIG. 12 is a flowchart illustrating a second procedure of obtaining by an MME an IP version supported by an eNB access by a UE according to an eighth method for establishing a user plane bearer of the present disclosure.

Referring to FIG. 12, at operation 1201, a source eNB (S-eNB) transmits a Handover Required message to the MME. The message includes an IP version supported by a target eNB (T-eNB). The S-eNB determines the IP version supported by the T-eNB according to a SCTP association process between the S-eNB and the T-eNB, or O&M configurations, or a process for finding a Transmission Network Layer (TNL) address of an S1 interface. The S-eNB may determine the IP address of the T-eNB according to a process of the related art for finding an IP address, and thus determine the IP version supported by the T-eNB. The MME stores the received IP version supported by the T-eNB.

The MME selects a version of a transport layer address between the T-eNB and the SGW according to an IP version supported by the T-eNB and a version of a transport layer address received by the MME from the SGW in a process for establishing a bearer. The processing is the same as that at 1003, and is not described herein.

At operation 1202, the MME transmits a Handover Request message to the T-eNB. The message includes an uplink TEID and a transport layer address to be established. The transport layer address is selected by the MME which may be IPv4 or IPv6.

At operation 1203, the T-eNB transmits a Handover Request Acknowledge to the MME. The T-eNB assigns the transport layer address according to the IP version in the received message. The Handover Request Acknowledge includes a downlink TEID and a transport layer address assigned by the T-eNB.

At operation 1204, the MME transmits a Handover Command to the S-eNB.

At operation 1205, the S-eNB transmits an RRC connection Reconfiguration message to the UE.

At operation 1206, the UE transmits an RRC connection Reconfiguration complete message to the T-eNB.

At operation 1207, the T-eNB transmits a Handover notification message to the MME.

Figure 13:
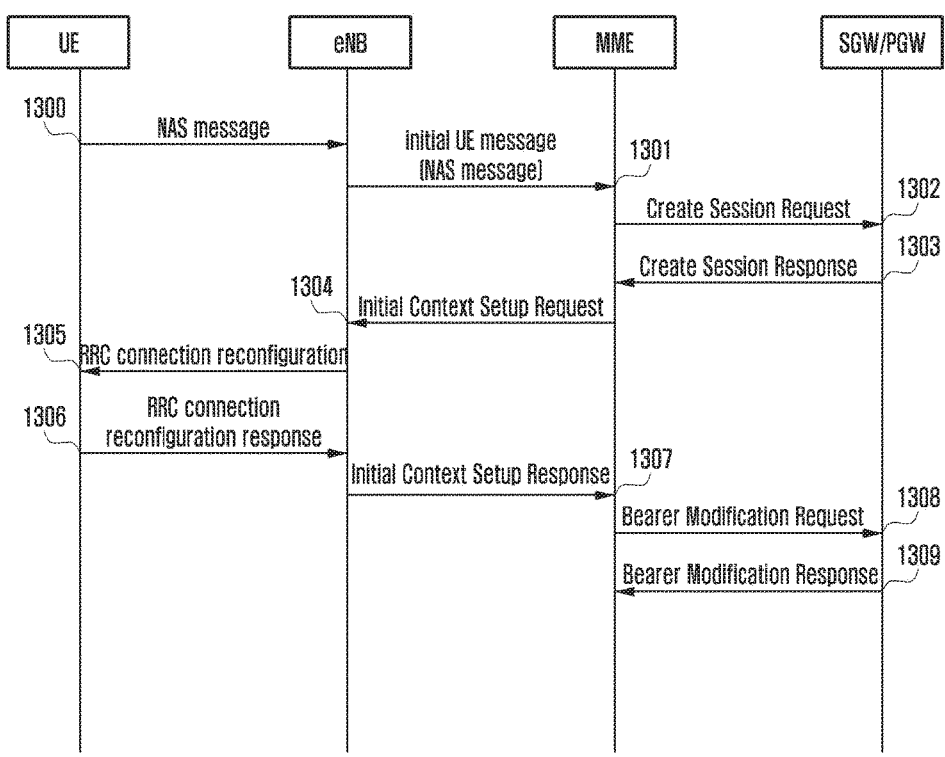
FIG. 13 is a flowchart illustrating a ninth method for establishing a user plane bearer according to an embodiment of the present disclosure.

FIG. 13 is a flowchart illustrating a ninth method for establishing a user plane bearer according to an embodiment of the present disclosure.

Referring to FIG. 13, an MME obtains an IP version supported by an eNB, and directly informs a SGW of a version of a transport layer address to be assigned, so that only one IP address needs to be transmitted through an S11 interface and an S1 interface. The method includes the following processing.

At operation 1300, a UE transmits a NAS message, e.g., an Attach Request through an RRC message to the eNB.

At operation 1301, the eNB transmits a NAS message, e.g., an Attach Request through an S1 initial UE Message to the MME. For the UE in active mode, the eNB may transmit the received NAS message through an S1 uplink NAS transmission message to the MME. The initial UE message or the uplink NAS transmission message includes an IP version supported by the eNB. The MME stores the received IP version supported by the eNB. In the handover procedure, the MME may obtain the IP version supported by a T-eNB through a Handover Required message.

At operation 1302, the MME transmits a Create Session Request to a SGW/PGW. If the SGW and the PGW are separated, the signaling process between the SGW and the PGW is omitted herein. The MME informs the SGW of a version of an uplink transport layer address to be assigned according to an IP version supported by an eNB accessed by the UE. If the eNB accessed by the UE supports the IPv4, the MME informs the SGW to assign a transport layer address of the IPv4. If the eNB accessed by the UE supports the IPv6, the MME informs the SGW to assign a transport layer address of the IPv6. If the eNB accessed by the UE supports both the IPv4 and the IPv6, the MME may select one of the IPv4 version and the IPv6 version and inform the SGW of the selected one. Or the MME may inform the SGW of the IPv4 and the IPv6, and the SGW selects one to use.

At operation 1303, the SGW/PGW transmits a Create Session Response to the MME. The Create Session Response includes a transport layer address and an uplink TEID of an S1 interface assigned by the SGW for each bearer of the UE. The transport layer address may include IPv4 or IPv6. The transport layer address only has one version.

At operation 1304, the MME transmits an Initial Context Setup Request to the eNB. The Initial Context Setup Request includes the transport layer address and the uplink TEID of an S1 interface assigned by the SGW for each bearer of the UE.

The processing at operations 1305 and 1306 are the same as the processing at operations 205 and 206 respectively, which are not described herein.

At operation 1307, the eNB transmits an Initial Context Setup Response to the MME. The eNB assigns a downlink TEID and transport layer address. The eNB assigns the IP address according to the version of the transport layer address received at 1304. The eNB transmits the assigned TEID and the transport layer address to the MME.

The processing at operations 1308 and 1309 are the same as the processing at operations 210 and 211 respectively, which are not described herein.

Figure 14:
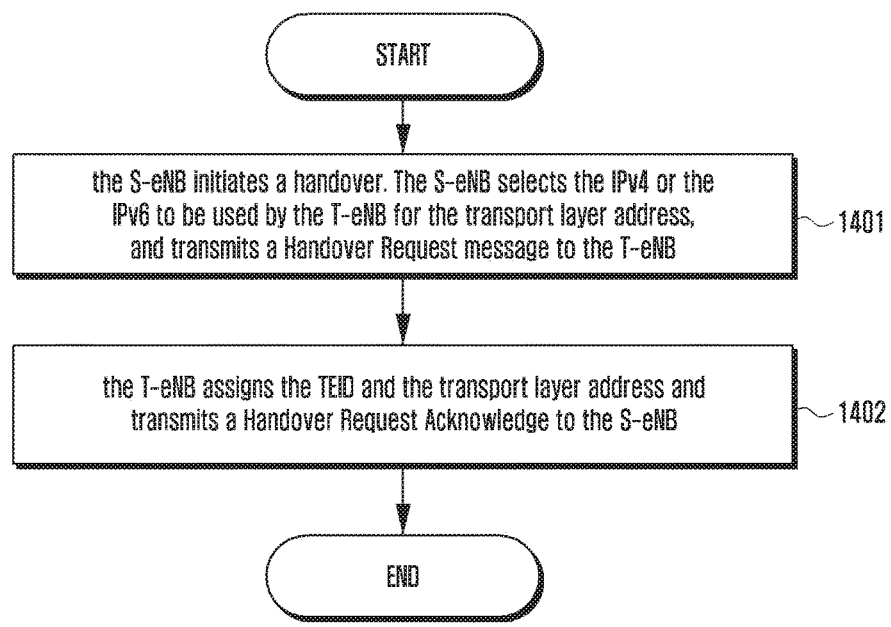
FIG. 14 is a flowchart illustrating a tenth method for establishing a user plane bearer according to an embodiment of the present disclosure.

FIG. 14 is a flowchart illustrating a tenth method for establishing a user plane bearer according to an embodiment of the present disclosure.

Referring to FIG. 14, in an X2 handover process, a source eNB (S-eNB) selects one of an IPv4 and an IPv6 for a user plane transport layer address of an interface of a target eNB (T-eNB). The interface of the T-eNB may be an interface between the T-eNB and a SGW, or an interface between the S-eNB and the T-eNBs. The method includes the following processing.

At operation 1401, the S-eNB initiates a handover for a UE. For a bearer of the UE, if a transport layer address received by the S-eNB from an MME in a process of establishing the bearer initially includes the IPv4 (or IPv6), and the T-eNB of the handover also supports the IPv4 (or IPv6), the bearer can be established in the T-eNB. The S-eNB selects to use the transport layer address of the IPv4 (or IPv6) between the T-eNB and the SGW.

The S-eNB may select the IP version between the S-eNB and the SGW to be used between T-eNB and SGW, and informs the T-eNB of the IP version to be used. The S-eNB may inform the T-eNB of the IP version to be used by an information element, or implicitly inform the T-eNB of the IP version to be used by using an uplink TEID and a transport layer address. If the transport layer address is the IPv4, the T-eNB needs to assign a transport layer address of the IPv4. If the transport layer address is the IPv6, the T-eNB needs to assign a transport layer address of the IPv6.

For a bearer needing data forwarding, the S-eNB may use an IP version between the S-eNB and the T-eNB, the same IP version between the S-eNB and the SGW. The S-eNB may inform the T-eNB of the IP version to be used by an information element, or implicitly inform the T-eNB of the IP version to be used by using the uplink TEID and the transport layer address. If the transport layer address is the IPv4, the T-eNB needs to assign a transport layer address of the IPv4 for data forwarding. If the transport layer address is the IPv6, the T-eNB needs to assign a transport layer address of the IPv6 for data forwarding.

For the bearer of the UE, if the transport layer address received by the S-eNB from an MME in a process of establishing the bearer initially includes both the IPv4 address and the IPv6 address, the S-eNB may select the IP version to be used for an interface between the T-eNB and the SGW according to the IP version supported by the T-eNB. If the T-eNB supports the IPv4, the S-eNB selects the IPv4. If the T-eNB supports the IPv6, the S-eNB selects the IPv6. If the T-eNB supports both the IPv4 and the IPv6, the S-eNB may select the IP version according to implementation or O&M configurations. If the T-eNB supports both the IPv4 and the IPv6, the S-eNB may select an IP version used between the S-eNB and the SGW to be used between T-eNB and SGW.

For the bearer of the UE, if the transport layer address received by the S-eNB from the MME in the process of establishing the bearer initially includes both the IPv4 address and the IPv6 address, for the bearer needing data forwarding, the S-eNB may select the IP version to be used for an interface between the T-eNB and the S-eNB according to the IP version supported by the T-eNB and the S-eNB. If the T-eNB and the S-eNB support the IPv4, the S-eNB selects the IPv4. If the T-eNB and the S-eNB support the IPv6, the S-eNB selects the IPv6. If the T-eNB and the S-eNB support both the IPv4 and the IPv6, the S-eNB may select the IP version according to implementation or O&M configurations. If the T-eNB and the S-eNB support both the IPv4 and the IPv6, the S-eNB may select the IP version used between the S-eNB and the SGW to be used between T-eNB and SGW.

The S-eNB transmits a Handover Request message to the T-eNB. The message includes the uplink TEID and the transport layer address of the version selected by the S-eNB. Or the S-eNB explicitly includes the IP version to be used by the T-eNB in the message.

At operation 1402, the T-eNB transmits a Handover Request Acknowledge to the S-eNB. The Handover Request Acknowledge includes the downlink TEID and the transport layer address assigned by the T-eNB. The T-eNB determines the transport layer address to be assigned according to the IP version to be assigned included in the message received from the S-eNB or according to the transport layer address of the IPv4 or IPv6 included in the message received from the S-eNB.

If the transport layer address to be assigned is the IPv4, and the T-eNB supports the IPv4, the T-eNB may assign the transport layer address of the IPv4, and transmit the assigned transport layer address to the S-eNB through the response. If the T-eNB does not support the IPv4, the T-eNB transmits a failure response to the S-eNB. The failure response includes a failure reason, e.g., the transport layer address is not supported. If the transport layer address to be assigned is the IPv6, and the T-eNB supports the IPv6, the T-eNB may assign the transport layer address of the IPv6, and transmit the assigned transport layer address to the S-eNB through the response. If the T-eNB does not support the IPv6, the T-eNB transmits a failure response to the S-eNB. The failure response includes a failure reason, e.g., the transport layer address is not supported.

The S-eNB transmits the downlink TEID and the transport layer address of the bearer which are received from the T-eNB to the MME. The MME transmits the downlink TEID and the transport layer address of the bearer to the SGW. If the IP version is changed during the handover, for example, the IP version is changed from the IPv4 to the IPv6, when receiving uplink data, the SGW receives the uplink data through the transport layer address corresponding to the new IP version. When transmitting downlink data, the SGW transmits the downlink data through the new TEID and the transport layer address.

By using the above method, when the SAE system includes both a device supporting the IPv4 and a device supporting the IPv6, the user plane bearer may be established correctly and successfully, thereby ensuring interoperability between different manufacturers, and avoiding modifying the MME.

Figure 15:
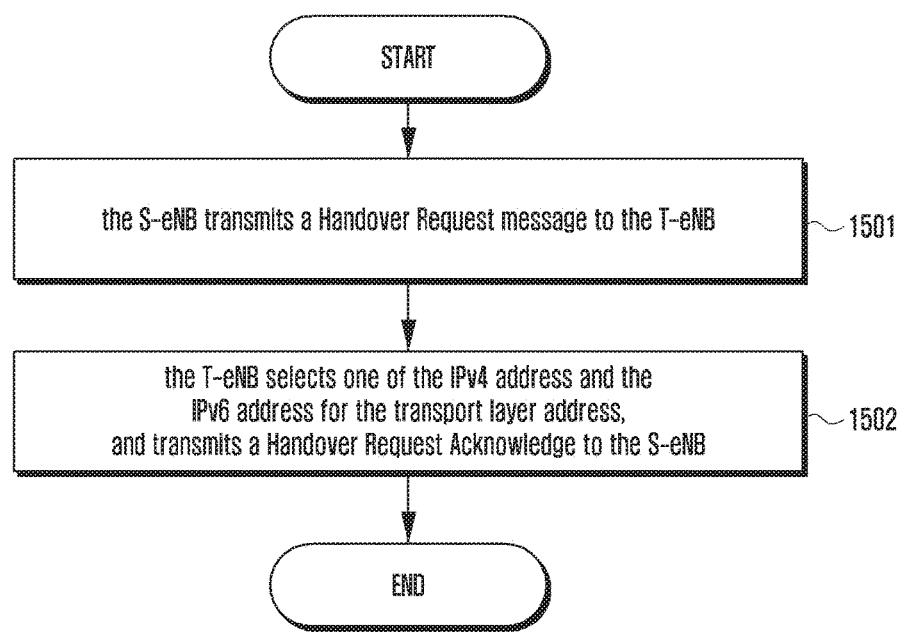
FIG. 15 is a schematic diagram illustrating an eleventh method for establishing a user plane bearer according to an embodiment of the present disclosure.

FIG. 15 is a schematic diagram illustrating an eleventh method for establishing a user plane bearer according to an embodiment of the present disclosure.

Referring to FIG. 15, in an X2 handover process, a T-eNB selects one of an IPv4 and an IPv6 for a user plane transport layer address of an interface of the T-eNB. The interface of the T-eNB may be an interface between a new T-eNB and a SGW, or an interface between an S-eNB and the T-eNB (user data forwarding). The method includes the following processing.

At operation 1501, the S-eNB transmits a Handover Request message to the T-eNB. The Handover Request message includes a TEID and a transport layer address which are received by the S-eNB from an MME in an initial process for creating a bearer of the UE. The transport layer address is received from the MME which may include an IPv4 address or an IPv6 address or both the IPv4 address and the IPv6 address.

At operation 1502, the T-eNB selects one of the IPv4 address and the IPv6 address for the interface between the T-eNB and the SGW or an interface between the S-eNB and the T-eNB.

If the transport layer address included in the Handover Request message received by the T-eNB from the S-eNB is the IPv4, and the T-eNB supports the IPv4, the T-eNB may assign the transport layer address of the IPv4. If the T-eNB does not support the IPv4, the T-eNB transmits a failure response to the S-eNB. The failure response includes a failure reason, e.g., the transport layer address is not supported.

If the transport layer address included in the Handover Request message received by the T-eNB from the S-eNB is the IPv6, and the T-eNB supports the IPv6, the T-eNB may assign the transport layer address of the IPv6. If the T-eNB does not support the IPv6, the T-eNB transmits a failure response to the S-eNB. The failure response includes a failure reason, e.g., the transport layer address is not supported.

If the transport layer address included in the Handover Request message received by the T-eNB from the S-eNB includes both the IPv4 address and the IPv6 address, the T-eNB may select the IPv4 address and the IPv6 address according to an IP version supported by the T-eNB. If the T-eNB supports the IPv4, the T-eNB assigns the transport layer address of the IPv4. If the T-eNB supports the IPv6, the T-eNB assigns the transport layer address of the IPv6. If the T-eNB supports both the IPv4 and the IPv6, the T-eNB selects the IPv4 or the IPv6 according to implementation or O&M configurations.

For the bearer needing data forwarding, when selecting one of the IPv4 and IPv6, the T-eNB may consider IP versions supported by the T-eNB and S-eNB. If the transport layer address included in the handover request received by the T-eNB from the S-eNB is the IPv4, and the T-eNB and S-eNB support the IPv4, the T-eNB assigns the transport layer address of the IPv4. If the T-eNB or S-eNB does not support the IPv4, the T-eNB transmits a failure response to the S-eNB. The failure response includes a failure reason, e.g., the transport layer address is not supported. If the transport layer address included in the handover request received by the T-eNB from the S-eNB is the IPv6, and the T-eNB and S-eNB support the IPv6, the T-eNB assigns the transport layer address of the IPv6. If the T-eNB or S-eNB does not support the IPv6, the T-eNB transmits a failure response to the S-eNB. The failure response includes a failure reason, e.g., the transport layer address is not supported. If the transport layer address included in the response received by the T-eNB from the S-eNB includes both the IPv4 address and the IPv6 address, the T-eNB may select the IPv4 address and the IPv6 address according to the IP versions supported by the T-eNB and the S-eNB, and assign a downlink transport layer address of a corresponding version. If the T-eNB and the S-eNB support the IPv4, the T-eNB selects the IPv4. If the T-eNB and the S-eNB support the IPv6, the T-eNB selects the IPv6. If the T-eNB and the S-eNB support both the IPv4 and the IPv6, the T-eNB selects the IPv4 or IPv6 according to implementation or O&M configurations.

The T-eNB transmits a Handover Request Acknowledge to the S-eNB. The Handover Request Acknowledge includes a downlink TEID and the transport layer address assigned by the T-eNB.

The S-eNB transmits the downlink TEID and the transport layer address of the bearer which are received from the T-eNB to the MME. The MME transmits the downlink TEID and the transport layer address of the bearer to the SGW. If the IP version is changed during the handover, for example, the IP version is changed from the IPv4 to the IPv6, when receiving uplink data, the SGW receives the uplink data through the transport layer address corresponding to the new IP version. When transmitting downlink data, the SGW transmits the downlink data through the new TEID and transport layer address.

By using the above method, when the SAE system includes both a device supporting the IPv4 and a device supporting the IPv6, the user plane bearer may be established correctly and successfully, thereby ensuring interoperability between different manufacturers, and avoiding modifying the MME.

Figure 16:
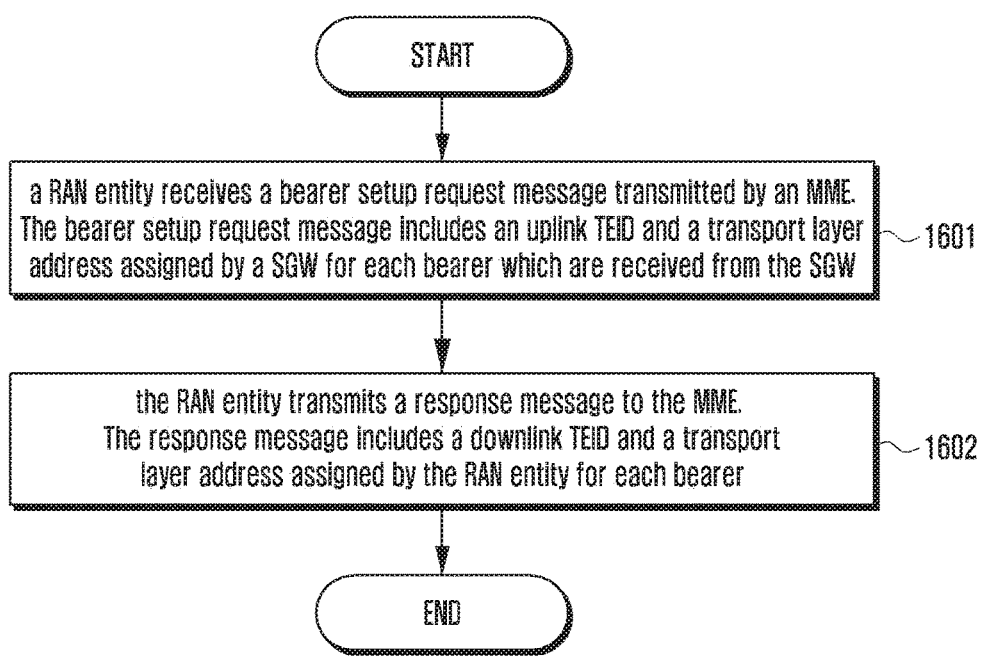
FIG. 16 is a flowchart illustrating a method for establishing a user plane bearer according to an embodiment of the present disclosure.

FIG. 16 is a flowchart illustrating a method for establishing a user plane bearer according to an embodiment of the present disclosure.

Referring to FIG. 16, at operation 1601, a RAN entity receives a bearer setup request message transmitted by an MME. The bearer setup request message includes an uplink TEID and a transport layer address assigned by a SGW for each bearer which are received from the SGW.

At operation 1602, the RAN entity transmits a response message to the MME. The response message includes a downlink TEID and a transport layer address assigned by the RAN entity for each bearer.

In the method, the RAN entity may be an eNB, an HeNB, an HeNB GW, a master eNB, a secondary eNB, and the like.

Further, the various embodiments of the present disclosure also provide a second method.

An MME receives a bearer setup request message transmitted by a SGW. The bearer setup request message includes an uplink TEID and a transport layer address assigned by the SGW for each bearer.

The MME transmits a second bearer setup request message to an access entity. The second bearer setup request message includes a downlink TEID and a transport layer address assigned by the SGW for each bearer.

Further, the various embodiments of the present disclosure also provide a third method.

A MME receives a message transmitted by an access entity. The message includes a transport layer address version supported by the access entity.

The MME transmits a create session request message to the SGW, a create session request message includes a transport layer address version supported by the access entity.

Figure 17:
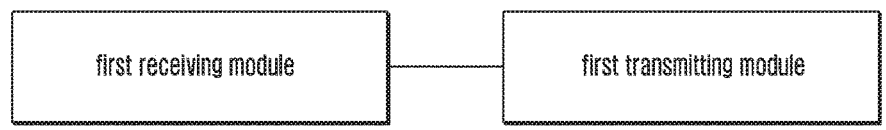
FIG. 17 is a schematic diagram illustrating an apparatus for establishing a user plane bearer according to an embodiment of the present disclosure.

FIG. 17 is a schematic diagram illustrating an apparatus for establishing a user plane bearer according to an embodiment of the present disclosure.

Referring to FIG. 17, the apparatus includes a first receiving module and a first transmitting module.

The first receiving module is to receive a bearer setup request message transmitted by an MME. The bearer setup request message includes an uplink TEID and a transport layer address assigned by a SGW for each bearer which are received from the SGW.

The first transmitting module is to transmit a response message to the MME. The response message includes a downlink TEID and a transport layer address assigned by the RAN entity for each bearer.

Further, the various embodiments of the present disclosure also provide an MME for establishing a user plane. The MME includes a second receiving module and a second transmitting module.

The second receiving module is to receive a bearer setup request message transmitted by a SGW. The bearer setup request message includes an uplink TEID and a transport layer address assigned by the SGW for each bearer.

The second transmitting module is to transmit a second bearer setup request message to an access entity at a terminal side. The second bearer setup request message includes a downlink TEID and a transport layer address assigned by the MME for each bearer.

Further, the various embodiments of the present disclosure also provide an MME for establishing a user plane. The MME includes a third receiving module and a session establishing module.

The third receiving module is to receive a message transmitted by an access entity. The message includes a transport layer address version supported by the access entity.

The session establishing module is to transmit a create session to the SGW, a create session request message includes a transport layer address version supported by the access entity.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method by a home evolved Node B gateway (HeNB GW), the method comprising:
   receiving, from a mobility management entity (MME), a first message for setting up of a user equipment (UE) context;
   selecting an IP version supported by a home evolved Node B (HeNB), if the first message includes two transport layer addresses of different IP versions; and
   transmitting, to the HeNB, a second message including a transport layer address corresponding to the selected IP version, the transport layer address being used for data transmission between a serving gateway (SGW) and the HeNB,
   wherein the first message includes two transport layer addresses of different IP versions in case of the HeNB GW which does not terminate a user plane.

2. The method of claim 1, wherein the first message comprises an initial context setup request message.

3. The method of claim 1, wherein the first message comprises a tunnel endpoint identifier (TEID).

4. The method of claim 1, wherein the selecting of the IP version comprises:
   determining, if the first message includes one transport layer address of one IP version, whether the IP version of the transport layer address included in the first message is supported by the HeNB.

5. The method of claim 4, further comprising:
   transmitting, if the IP version of the transport layer address included in the first message is supported by the HeNB, a second message including the transport layer address of the IP version to the HeNB; and
   transmitting, if the IP version of the transport layer address included in the first message is not supported by the HeNB, a failure response to a mobility management entity (MME).

6. An apparatus for establishing a user plane bearer, the apparatus comprising:
   a transceiver; and
   a controller coupled with the transceiver and configured to:
      receive, from a mobility management entity (MME), a first message for setting up of a UE context,
      select an IP version supported by the a home evolved Node B (HeNB), if the first message includes two transport layer addresses of different versions, and
      transmit, to the HeNB, a second message including a transport layer address corresponding to the selected IP version, the transport layer address being used for data transmission between a serving gateway (SGW) and the HeNB,
      wherein the first message includes two transport layer addresses of different IP versions in case of the HeNB GW which does not terminate a user plane.

7. The apparatus of claim 6, wherein the first message comprises an initial context setup request message.

8. The apparatus of claim 6, wherein the first message comprises a tunnel endpoint identifier (TEID).

9. The apparatus of claim 6, wherein the controller is further configured to:
   determine, if the first message includes one transport layer address of one IP version, whether the IP version of the transport layer address included in the first message is supported by the HeNB.

10. The apparatus of claim 9, wherein the controller is further configured to:
    transmit, if the IP version of the transport layer address included in the first message is supported by the HeNB, a second message including the transport layer address of the IP version to the HeNB, and
    transmit, if the IP version of the transport layer address included in the first message is not supported by the HeNB, a failure response to a mobility management entity (MME).

11. A method by a mobility management entity (MME), the method comprising:
    receiving a first message including two transport layer addresses of different IP versions; and
    transmitting, to a home evolved Node B gateway (HeNB GW), a second message including the two transport layer addresses of different IP versions,
    wherein an IP version supported by a home evolved Node B (HeNB) is selected by the HeNB GW,
    wherein the transport layer address is used for data transmission between a serving gateway (SGW) and the HeNB, and
    wherein the second message includes two transport layer addresses of different IP versions in case of the HeNB GW which does not terminate a user plane.

12. The method of claim 11, wherein the second message comprises an initial context setup request message.

13. The method of claim 11, wherein the second message comprises a tunnel endpoint identifier (TEID).

14. An apparatus for establishing a user plane bearer, the apparatus comprising:
    a transceiver; and
    a controller coupled with the transceiver and configured to:
       receive a first message including two transport layer addresses of different IP versions, and
       transmit, to a home evolved Node B gateway (HeNB GW), a second message including the two transport layer addresses of different IP versions,
       wherein an IP version supported by a home evolved Node B (HeNB) is selected by the HeNB GW,
       wherein the transport layer address is used for data transmission between a serving gateway (SGW) and the HeNB, and
       wherein the second message includes two transport layer addresses of different IP versions in case of the HeNB GW which does not terminate a user plane.

15. The apparatus of claim 14, wherein the second message comprises an initial context setup request message.

16. The apparatus of claim 14, wherein the second message comprises a tunnel endpoint identifier (TEID).

* * * * *